US007882369B1

(12) United States Patent
Kelleher et al.

(10) Patent No.: US 7,882,369 B1
(45) Date of Patent: Feb. 1, 2011

(54) PROCESSOR PERFORMANCE ADJUSTMENT SYSTEM AND METHOD

(75) Inventors: Brian M. Kelleher, Palo Alto, CA (US);
Ludger Mimberg, San Jose, CA (US);
Kevin Kranzusch, Campbell, CA (US);
John Lam, Sunnyvale, CA (US); Senthil S. Velmurugan, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 924 days.

(21) Appl. No.: 10/295,619

(22) Filed: Nov. 14, 2002

(51) Int. Cl.
*G06F 1/00* (2006.01)
*G06F 1/26* (2006.01)
*G06F 1/32* (2006.01)

(52) U.S. Cl. .................. 713/300; 713/320; 713/322; 345/419

(58) Field of Classification Search .................. 713/300, 713/320, 322; 345/419
See application file for complete search history.

(56) References Cited

U.S. PATENT DOCUMENTS

| | | | |
|---|---|---|---|
| 4,335,445 A | 6/1982 | Nercessian | |
| 4,544,910 A | 10/1985 | Hoberman | |
| 4,679,130 A | 7/1987 | Moscovici | |
| 4,706,180 A | 11/1987 | Wills | |
| 4,739,252 A | 4/1988 | Malaviya et al. | |
| 4,868,832 A | 9/1989 | Marrington et al. | |
| 4,893,228 A | 1/1990 | Orrick et al. | |
| 5,086,501 A * | 2/1992 | DeLuca et al. ............. | 713/300 |
| 5,103,110 A | 4/1992 | Housworth et al. | |
| 5,167,024 A | 11/1992 | Smith et al. | |
| 5,177,431 A | 1/1993 | Smith et al. | |
| 5,201,059 A | 4/1993 | Nguyen | |
| 5,204,863 A | 4/1993 | Saint-Joigny et al. | |
| 5,218,704 A | 6/1993 | Watts, Jr. et al. | |
| 5,218,705 A * | 6/1993 | DeLuca et al. ............. | 340/7.37 |
| 5,230,055 A | 7/1993 | Katz et al. | |
| 5,239,652 A | 8/1993 | Seibert et al. | |

(Continued)

FOREIGN PATENT DOCUMENTS

EP         0381021         8/1990

(Continued)

OTHER PUBLICATIONS

Calavert, J.B., "The Phase-Locked Loop", Jul. 24, 2001, http://www.du.edu/~etuttle/electron/elect12.htm.

(Continued)

*Primary Examiner*—Ji H. Bae

(57) ABSTRACT

The present invention performance enhancement and reliability maintenance system and method pushes a processor to its maximized performance capabilities when performing processing intensive tasks (e.g., 3D graphics, etc). For example, a clock speed and voltage are increased until an unacceptable error rate begins to appear in the processing results and then the clock speed and voltage are backed off to the last setting at which excessive errors did not occur, enabling a processor at its full performance potential. The present invention also includes the ability to throttle back settings which facilitates the maintenance of desired reliability standards. The present invention is readily expandable to provide adjustment for a variety of characteristics in response to task performance requirements. For example, a variable speed fan that is software controlled can be adjusted to alter the temperature of the processor in addition to clock frequency and voltage.

68 Claims, 11 Drawing Sheets

U.S. PATENT DOCUMENTS

| | | | |
|---|---|---|---|
| 5,254,878 A | 10/1993 | Olsen | |
| 5,307,003 A * | 4/1994 | Fairbanks et al. | 323/222 |
| 5,337,254 A | 8/1994 | Knee et al. | |
| 5,339,445 A | 8/1994 | Gasztonyi | |
| 5,350,988 A | 9/1994 | Le | |
| 5,410,278 A | 4/1995 | Itoh et al. | |
| 5,422,806 A | 6/1995 | Chen et al. | |
| 5,440,520 A | 8/1995 | Schutz et al. | |
| 5,446,365 A | 8/1995 | Nomura et al. | |
| 5,461,266 A | 10/1995 | Koreeda et al. | |
| 5,502,838 A | 3/1996 | Kikinis | 395/550 |
| 5,511,203 A | 4/1996 | Wisor et al. | |
| 5,513,152 A | 4/1996 | Cabaniss | |
| 5,560,020 A | 9/1996 | Nakatani et al. | |
| 5,561,692 A | 10/1996 | Maitland et al. | |
| 5,568,103 A | 10/1996 | Nakashima et al. | |
| 5,568,350 A | 10/1996 | Brown | |
| 5,586,308 A | 12/1996 | Hawkins et al. | |
| 5,587,672 A * | 12/1996 | Ranganathan et al. | 326/93 |
| 5,589,762 A | 12/1996 | Iannuzo | |
| 5,592,173 A | 1/1997 | Lau et al. | |
| 5,594,360 A | 1/1997 | Wojciechowski | |
| 5,630,110 A * | 5/1997 | Mote, Jr. | 713/501 |
| 5,648,766 A | 7/1997 | Stengel et al. | |
| 5,675,272 A | 10/1997 | Chu | |
| 5,680,359 A | 10/1997 | Jeong | |
| 5,682,093 A | 10/1997 | Kivela | |
| 5,692,204 A | 11/1997 | Rawson et al. | |
| 5,717,319 A | 2/1998 | Jokinen | |
| 5,719,800 A | 2/1998 | Mittal et al. | |
| 5,727,208 A | 3/1998 | Brown | |
| 5,737,613 A | 4/1998 | Mensch, Jr. | |
| 5,742,142 A | 4/1998 | Witt | |
| 5,745,375 A | 4/1998 | Reinhardt et al. | 364/492 |
| 5,752,011 A | 5/1998 | Thomas et al. | 395/556 |
| 5,754,869 A | 5/1998 | Holzhammer et al. | |
| 5,757,171 A | 5/1998 | Babcock et al. | |
| 5,757,172 A | 5/1998 | Hunsdorf et al. | |
| 5,760,636 A * | 6/1998 | Noble et al. | 327/513 |
| 5,764,110 A | 6/1998 | Ishibashi | |
| 5,778,237 A | 7/1998 | Yamamoto et al. | |
| 5,796,313 A | 8/1998 | Eitan | |
| 5,812,860 A * | 9/1998 | Horden et al. | 713/322 |
| 5,815,724 A | 9/1998 | Mates | |
| 5,825,674 A | 10/1998 | Jackson | |
| 5,825,972 A | 10/1998 | Brown | |
| 5,847,552 A | 12/1998 | Brown | |
| 5,848,281 A | 12/1998 | Smalley et al. | |
| 5,864,225 A | 1/1999 | Bryson | |
| 5,884,049 A | 3/1999 | Atkinson | |
| 5,894,577 A | 4/1999 | MacDonald et al. | |
| 5,923,545 A | 7/1999 | Nguyen | |
| 5,933,649 A | 8/1999 | Lim et al. | |
| 5,940,785 A | 8/1999 | Georgiou et al. | |
| 5,940,786 A | 8/1999 | Steeby | |
| 5,952,798 A | 9/1999 | Jones et al. | |
| 5,974,557 A | 10/1999 | Thomas et al. | |
| 5,977,763 A | 11/1999 | Loughmiller et al. | |
| 5,996,083 A | 11/1999 | Gupta et al. | |
| 5,996,084 A | 11/1999 | Watts | |
| 6,011,403 A | 1/2000 | Gillette | |
| 6,023,776 A | 2/2000 | Ozaki | |
| 6,025,737 A | 2/2000 | Patel et al. | |
| 6,035,407 A | 3/2000 | Gebara et al. | |
| 6,040,668 A | 3/2000 | Huynh et al. | |
| 6,047,248 A | 4/2000 | Georgiou et al. | 702/132 |
| 6,065,126 A | 5/2000 | Tran et al. | |
| 6,065,131 A | 5/2000 | Andrews et al. | |
| 6,124,732 A | 9/2000 | Zilic et al. | |
| 6,134,167 A | 10/2000 | Atkinson | |
| 6,163,583 A | 12/2000 | Lin et al. | 375/354 |
| 6,167,529 A | 12/2000 | Dalvi | |
| 6,172,943 B1 | 1/2001 | Yuzuki | |
| 6,216,234 B1 | 4/2001 | Sager et al. | |
| 6,229,747 B1 | 5/2001 | Cho et al. | |
| 6,242,936 B1 | 6/2001 | Ho et al. | |
| 6,243,656 B1 | 6/2001 | Arai et al. | |
| 6,304,824 B1 | 10/2001 | Bausch et al. | |
| 6,310,912 B1 | 10/2001 | Maiocchi et al. | |
| 6,363,490 B1 | 3/2002 | Senyk | 713/300 |
| 6,366,157 B1 | 4/2002 | Abdesselem et al. | 327/535 |
| 6,369,557 B1 | 4/2002 | Agiman | |
| 6,407,571 B1 | 6/2002 | Furuya et al. | |
| 6,415,388 B1 | 7/2002 | Browning et al. | 713/322 |
| 6,422,746 B1 | 7/2002 | Weiss et al. | |
| 6,425,086 B1 | 7/2002 | Clark et al. | 713/322 |
| 6,426,641 B1 | 7/2002 | Koch et al. | |
| 6,448,815 B1 | 9/2002 | Talbot et al. | |
| 6,456,049 B2 | 9/2002 | Tsuji | |
| 6,457,134 B1 | 9/2002 | Lemke et al. | |
| 6,470,289 B1 | 10/2002 | Peters et al. | 702/132 |
| 6,476,632 B1 | 11/2002 | La Rosa et al. | |
| 6,484,041 B1 * | 11/2002 | Aho et al. | 455/574 |
| 6,489,796 B2 | 12/2002 | Tomishima | |
| 6,535,424 B2 | 3/2003 | Le et al. | |
| 6,535,986 B1 * | 3/2003 | Rosno et al. | 713/400 |
| 6,600,575 B1 | 7/2003 | Kohara | |
| 6,621,242 B2 | 9/2003 | Huang et al. | |
| 6,630,754 B1 | 10/2003 | Pippin | 307/117 |
| 6,650,074 B1 | 11/2003 | Vyssotski et al. | |
| 6,650,740 B1 | 11/2003 | Adamczyk et al. | |
| 6,657,504 B1 | 12/2003 | Deal et al. | |
| 6,662,775 B2 * | 12/2003 | Hauser | 123/241 |
| 6,668,346 B1 | 12/2003 | Schulz et al. | |
| 6,674,587 B2 | 1/2004 | Chhabra et al. | |
| 6,678,831 B1 | 1/2004 | Mustafa et al. | |
| 6,690,219 B2 | 2/2004 | Chuang | |
| 6,703,803 B2 | 3/2004 | Ohiwa et al. | |
| 6,714,891 B2 | 3/2004 | Dendinger | 702/132 |
| 6,718,496 B1 * | 4/2004 | Fukuhisa et al. | 714/733 |
| 6,721,892 B1 * | 4/2004 | Osborn et al. | 713/300 |
| 6,737,860 B2 | 5/2004 | Hsu et al. | |
| 6,748,408 B1 | 6/2004 | Bredin et al. | |
| 6,774,587 B2 | 8/2004 | Makaran et al. | |
| 6,792,379 B2 | 9/2004 | Ando | |
| 6,794,836 B2 | 9/2004 | Strothmann et al. | |
| 6,795,075 B1 * | 9/2004 | Streitenberger et al. | 345/502 |
| 6,795,927 B1 | 9/2004 | Altmejd et al. | 713/300 |
| 6,799,134 B2 | 9/2004 | Borchers et al. | |
| 6,801,004 B2 | 10/2004 | Frankel et al. | |
| 6,804,131 B2 | 10/2004 | Galbiati et al. | |
| 6,806,673 B2 | 10/2004 | Ho | |
| 6,815,938 B2 | 11/2004 | Horimoto | |
| 6,815,971 B2 | 11/2004 | Wang et al. | |
| 6,831,448 B2 | 12/2004 | Ishii et al. | |
| 6,836,849 B2 | 12/2004 | Brock et al. | |
| 6,837,063 B1 | 1/2005 | Hood, III et al. | |
| 6,853,259 B2 | 2/2005 | Norman et al. | |
| 6,853,569 B2 | 2/2005 | Cheng et al. | |
| 6,885,233 B2 | 4/2005 | Huard et al. | 327/513 |
| 6,889,331 B2 | 5/2005 | Soerensen et al. | |
| 6,914,492 B2 | 7/2005 | Hui et al. | |
| 6,947,865 B1 | 9/2005 | Mimberg et al. | |
| 6,970,798 B1 | 11/2005 | Cao, et al. | |
| 6,975,087 B1 | 12/2005 | Crabill et al. | |
| 6,976,112 B2 | 12/2005 | Franke et al. | |
| 6,987,370 B2 | 1/2006 | Chheda et al. | |
| 6,990,594 B2 | 1/2006 | Kim | |
| 7,003,421 B1 | 2/2006 | Allen, III et al. | |
| 7,005,894 B2 | 2/2006 | Weder | |
| 7,042,296 B2 | 5/2006 | Hui et al. | |
| 7,043,649 B2 | 5/2006 | Terrell, II | |
| 7,045,993 B1 | 5/2006 | Tomiyoshi | |
| 7,051,215 B2 | 5/2006 | Zimmer et al. | |

| | | | |
|---|---|---|---|
| 7,068,557 B2 | 6/2006 | Norman et al. | |
| 7,071,640 B2 | 7/2006 | Kurosawa et al. | |
| 7,100,061 B2 | 8/2006 | Halepete et al. | 713/322 |
| 7,112,978 B1 | 9/2006 | Koniaris et al. | |
| 7,119,522 B1 | 10/2006 | Tomiyoshi | |
| 7,129,745 B2 | 10/2006 | Lewis et al. | |
| 7,149,909 B2 | 12/2006 | Cui et al. | |
| 7,180,322 B1 | 2/2007 | Koniaris et al. | |
| 7,256,571 B1 | 8/2007 | Mimberg et al. | |
| 7,334,198 B2 | 2/2008 | Ditzel et al. | |
| 7,336,090 B1 | 2/2008 | Koniaris et al. | |
| 7,336,092 B1 | 2/2008 | Koniaris et al. | |
| 7,348,827 B2 | 3/2008 | Rahim et al. | |
| 7,348,836 B1 | 3/2008 | Velmurugan | |
| 7,363,176 B2 | 4/2008 | Patel et al. | |
| 7,509,504 B1 | 3/2009 | Koniaris et al. | |
| 7,739,531 B1 | 6/2010 | Krishnan | |
| 2001/0033504 A1 | 10/2001 | Galbiati et al. | |
| 2001/0045779 A1 | 11/2001 | Lee et al. | |
| 2002/0002689 A1 | 1/2002 | Yeh | |
| 2002/0026597 A1 | 2/2002 | Dai et al. | |
| 2002/0029352 A1 | 3/2002 | Borkar et al. | |
| 2002/0032829 A1 | 3/2002 | Dalrymple | |
| 2002/0049920 A1 | 4/2002 | Staiger | |
| 2002/0073348 A1 | 6/2002 | Tani | |
| 2002/0083356 A1 | 6/2002 | Dai | |
| 2002/0087896 A1 | 7/2002 | Cline et al. | |
| 2002/0113622 A1 | 8/2002 | Tang | |
| 2002/0116650 A1 | 8/2002 | Halepete et al. | |
| 2002/0138778 A1 | 9/2002 | Cole et al. | |
| 2002/0178390 A1 | 11/2002 | Lee | |
| 2002/0194509 A1 | 12/2002 | Plante et al. | |
| 2003/0036876 A1 | 2/2003 | Fuller, III et al. | |
| 2003/0065960 A1 | 4/2003 | Rusu et al. | |
| 2003/0074591 A1 | 4/2003 | McClendon et al. | |
| 2003/0110423 A1 | 6/2003 | Helms et al. | |
| 2003/0133621 A1 | 7/2003 | Fujii et al. | |
| 2003/0189465 A1 | 10/2003 | Abadeer et al. | |
| 2004/0025061 A1 | 2/2004 | Lawrence | |
| 2004/0073821 A1 | 4/2004 | Naveh et al. | |
| 2004/0105237 A1* | 6/2004 | Hoover et al. | 361/711 |
| 2004/0123170 A1 | 6/2004 | Tschanz et al. | |
| 2004/0128631 A1 | 7/2004 | Ditzel et al. | |
| 2005/0007047 A1 | 1/2005 | Strothmann et al. | |
| 2005/0071705 A1 | 3/2005 | Bruno et al. | |
| 2005/0218871 A1 | 10/2005 | Kang et al. | |
| 2005/0268189 A1 | 12/2005 | Soltis, Jr. | |
| 2005/0289367 A1 | 12/2005 | Clark et al. | |
| 2006/0074576 A1 | 4/2006 | Patel et al. | |
| 2007/0229054 A1 | 10/2007 | Dobberpuhl et al. | |
| 2007/0257710 A1 | 11/2007 | Mari et al. | |
| 2007/0296440 A1 | 12/2007 | Takamiya et al. | |
| 2008/0143372 A1 | 6/2008 | Koniaris et al. | |

FOREIGN PATENT DOCUMENTS

| | | |
|---|---|---|
| EP | 0501655 | 9/1992 |
| EP | 0978781 | 9/2000 |
| EP | 1096360 | 5/2001 |
| EP | 1182538 | 2/2002 |
| EP | 1182556 | 2/2002 |
| EP | 1398639 | 3/2004 |
| EP | 0474963 | 8/2009 |
| GB | 2342471 | 4/2000 |
| GB | 2393540 | 3/2004 |
| GB | 2404792 | 2/2005 |
| JP | H07129277 | 5/1995 |
| JP | 409185589 | 7/1997 |
| JP | 3076234 | 8/2000 |
| JP | 2000284862 | 10/2000 |
| JP | 2003122459 | 4/2003 |
| JP | 2003195981 | 7/2003 |
| WO | 0127728 | 4/2001 |
| WO | 200379171 | 9/2003 |

OTHER PUBLICATIONS

Request For Continued Examination filed on Dec. 19, 2007.
Ralph Grisham, Lecture Notes, "Computer System Design-Spring 2002," "Lecture 2: Combinational Logic Design", 2002, Department of Computer Science, New York University.
Migdal, et al.; "A Processor Temperature and Mode Adjustment System and Method", U.S. Appl. No.: 10/295,748; Filing Date: Nov. 14, 2002.
Alben, et al.; "A Processor Speed Adjustment System and Method", U.S. Appl. No.: 10/449,942; Filing Date: May 30, 2003.
Alben, et al.; "A Processor Voltage Adjustment System and Method", U.S. Appl. No.: 10/448,891; Filing Date: May 30, 2003.
Laplante, P. Comprehensive Dictionary of Electrical Engineering, CRC Press, IEEE Press, pp. 164-165.
Microsoft Technology Inc., Linear Voltage Fan Speed Control Using Microchip's TC64X Family pp. 1-4, 2003.
Notice of Allowance, Mail Date Aug. 21, 2008; U.S. Appl. No. 10/449,942.
Notice of Allowance, Mail Date Dec. 17, 2008; U.S. Appl. No. 10/449,942.
Notice of Allowance, Mail Date Mar. 30, 2009; U.S. Appl. No. 10/449,942.
Final Office Action, Mail Date Apr. 1, 2008; U.S. Appl. No. 10/449,942.
Non Final Office Action, Mail Date May 16, 2007; U.S. Appl. No. 10/449,942.
Final Office Action, Mail Date Aug. 9, 2006; U.S. Appl. No. 10/449,942.
Non Final Office Action, Mail Date Dec. 28, 2005; U.S. Appl. No. 10/449,942.
Final Office action, Mail Date Apr. 12, 2006; U.S. Appl. No. 10/295,748.
Final Office Action, Mail Date Apr. 25, 2008; U.S. Appl. No. 10/295,748.
Final Office Action, Mail Date Jun. 8, 2007; U.S. Appl. No. 10/295,748.
Final Office Action, Mail Date Aug. 20, 2004; U.S. Appl. No. 10/295,748.
Non Final Office Action, Mail Date Apr. 12, 2004; U.S. Appl. No. 10/295,748.
Non Final Office Action, Mail Date Sep. 14, 2005; U.S. Appl. No. 10/295,748.
Non Final Office Action, Mail Date Oct. 2, 2006; U.S. Appl. No. 10/295,748.
Non Final Office Action, Mail Date Dec. 23, 2004; U.S. Appl. No. 10/295,748.
Notice of Allowance, Mail Date Apr. 23, 2008; U.S. Appl. No. 10/295,748.
Notice of Allowance, Mail Date Aug. 21, 2008; U.S. Appl. No. 10/295,748.
Notice of Allowance, Mail Date Nov. 20, 2007; U.S. Appl. No. 10/295,748.
Notice of Allowance, Mail Date Dec. 12, 2008; U.S. Appl. No. 10/295,748.
Notice of Allowance, Mail Date Jul. 10, 2009; U.S. Appl. No. 10/295,748.
Notice of Allowance, Mail Date Jul. 15, 2009; U.S. Appl. No. 10/449,942.
Non Final Office Action, Mail Date Nov. 15, 2007; Application no. 10/448,891.
Notice of Allowance, Mail Date Feb. 12, 2009; Application no. 10/448,891.
Notice of Allowance, Mail Date Nov. 10, 2008; U.S. Appl. No. 10/448,891.
Notice of Allowance, Mail Date Jul. 21, 2008; U.S. Appl. No. 10/448,891.
Final Office Action, Mail Date Jun. 28, 2006; U.S. Appl. No. 10/448,891.
Non Final Office Action, Mail Date Jan. 13, 2006; U.S. Appl. No. 10/448,891.

Non Final Office Action, Mail Date Feb. 20, 2007; U.S. Appl. No. 10/448,891.
Notice of Allowance, Mail Date Jun. 2, 2009; U.S. Appl. No. 10/448,891.
Notice of Allowance, Mail Date Sep. 16, 2009; U.S. Appl. No. 10/448,891.
"Computer Software", Wikipedia, http://en.wikipedia.org/wiki/software, retrieved May, 2, 2007.
"High Spee, Digitally Adjusted Stepdown Controllers For Notebook CPUS", Maxim Manual, pp. 11 & 21.
"Operation U (Refer to Functional Diagram)", LTC 1736 Linear Technology Manual, p. 9.
Baker, K. et al.; Shmoo Plotting: The Black Art Of IC Testing, IEEE Design and Test Of Computers, IEEE vol. 14, No. 3; Jul. 1, 1997; pp. 90-97; XP000793305 ISSN: 0740-7475, the whole document.

Baker, K. et al.; "Wafer Burn-In Isolation Circuit" IBM Technical Disclosure Bulletin, IBM Corp., New York, US, vol. 32, No. 6B, Nov. 1, 1989, pp. 442-443, XP00073858 ISSN; 0018-8689, the whole document.
Oner, H. et al.; "A Compact Monitoring Circuit for Real-Time-On-Chip Diagnosis of Hot-Carrier Induced Degradation", Microelectronics Test Structures, 1997. ICMTS 1997. Proceedings, IEEE International Conference on Monterey, CA Mar. 17, 1997-Mar. 20, 1997, pp. 72-76.
Non Final Office Action; Mail Date Feb. 17, 2010; U.S. Appl. No. 10/295,748.
Non-Final Office Action Dated Feb. 17, 2010; U.S. Appl. No. 10/295,748.

\* cited by examiner

400

410

Adjusting the voltage level of a power supply signal supplied to a processor.

420

Altering the frequency of a clock signal that clocks the processor.

430

Manipulating the temperature of the processor.

440

Determining combinations of voltage level values of the power signal and frequency values of the clock signal at which the performance of the processor begins to fail.

Sensing the temperature of a processor.

520

Adjusting the clock speed of the processor if the temperature is outside a predetermined range.

530

Adjusting the fan operation if the temperature is above a predetermined value.

FIG 5

PROCESSOR PERFORMANCE ADJUSTMENT SYSTEM AND METHOD

The present Application is related to the following co-pending Applications:

Application entitled "A Processor Temperature and Mode Adjustment System and Method", application Ser. No. 10/295,748 filed Nov. 14, 2002;

Application entitled "A Processor Speed Adjustment System and Method", application Ser. No. 10/449,942 filed May 30, 2003; and Application entitled "A Processor Voltage Adjustment System and Method", application Ser. No. 10/448,891 filed May 30, 2003.

FIELD OF THE INVENTION

The present invention relates to the field of processor operation. More particularly, the present invention relates to a system and method for adjusting graphics processor performance.

BACKGROUND OF THE INVENTION

Electronic systems and circuits have made a significant contribution towards the advancement of modern society and are utilized in a number of applications to achieve advantageous results. Numerous electronic technologies such as digital computers, calculators, audio devices, video equipment, and telephone systems facilitate increased productivity and cost reduction in analyzing and communicating data, ideas and trends in most areas of business, science, education and entertainment. Frequently, these activities involve significant information processing. However, the speed at which a processor can reliably provide accurate results is limited and typically degrades over time. Most systems limit processor operation within conservative boundaries and sacrifice possible increased performance so that the processor can meet reliability standards.

Advanced applications are creating ever greater demands for faster processor performance. For example, the desired objective of numerous applications is to provide a visual presentation to a user (e.g., on a display monitor). Displaying information in a visual presentation is usually a convenient and effective method of conveying the information. Display devices (cathode ray tube monitors, liquid crystal displays, etc.) usually present images by coordinating the illumination characteristics of numerous picture elements (pixels). However, many graphics presentations, especially interactive 3D graphics presentations, usually require significant processing of large amounts of data at a rapid rate. Providing image information for each pixel is very data intensive and consumes a significant amount of processing resources. Advanced graphics applications such as three dimensional graphics utilized in modern gaming applications require significant amounts of information associated with each pixel (e.g., primary color intensity, transparency, brightness, texture and shading) to be produced at rates fast enough to provide a smooth and interactive presentation.

Graphics information generation is often best performed by dedicated graphics subsystem resources including graphics processor units. Separate graphics processors relieve the central processor of performing many of the graphics processing tasks. Graphics processors are usually specifically configured for performance of graphics activities enabling a graphics processor to perform many graphics operations faster and more efficiently than a central processor.

The amount of information and speed at which it is processed by a processor is determined by a variety of factors. For example, the number of transistors and their configuration on the chip usually affect the bandwidth and speed at which the processing can occur. Generally, a larger number of transistors can process information quicker than a smaller number of transistors operating at the same clock frequency. However, at some point increasing the number of transistors becomes cost prohibitive. Another factor that affects the processing speed is the clock frequency. A processor typically performs operations in a sequence of events (e.g., fetching, decoding and executing instructions), the order and timing of which are usually critical. A processor typically relies upon a clock signal to provide appropriate synchronization and satisfy requisite timing constraints. However, increasing the clock frequency is often limited by the characteristics of the transistors utilized to perform the processing. Higher voltages can be used to sustain operations at a higher clock frequency, and higher clock frequencies and voltage supplies cause a processor to consume more power, thereby increasing the temperature of the processor. However, higher temperatures generally cause transistors to operate more slowly, causing a lower operational transistor speed. Continually Running a processor at a high temperature stresses the semiconductor device and reduces long term reliability of the device.

The basic electronic component for performing most of the switching operations in a processor is a transistor. There are a number of factors that can affect the degradation of a transistor's ability to quickly and reliably perform switching operations. For example, the drain current saturation ($I_{d,sat}$) is one of the underlying physical mechanisms involved in transistor switching operations and is often utilized to indicate how fast a transistor can perform switching operations. The drain current saturation rating of a transistor can be adversely impacted by the temperature and voltage level at which the transistor is operating, causing deterioration in the transistor switching speed. These limitations impact maximum clock frequencies since transistor reliability is often degraded by increased voltage levels and temperatures associated with relatively high clock frequencies.

Most processors are identified by a particular fixed nominal clock frequency at which the processor is expected to provide reliable results over a specific life span (e.g., 10 years). Numerous systems operate the processor at the fixed nominal clock frequency continuously for the life of the processor even though a task does not require the level of processing speed provided by the fixed nominal clock frequency. The fixed nominal frequency is typically not the fastest frequency the processor can possibly operate at and resource utilization is not maximized. To the extent traditional processing systems attempt clock frequency adjustment, they are usually limited to downward adjustments from the fixed nominal clock frequency to achieve power conservation, further limiting the maximization of processor performance speed. Some traditional processing systems also attempt to make various adjustments in response to temperature measurements. These attempts are also typically limited in scope (such as a single specific adjustment) and usually have limited or no consideration for impacts on processing performance (e.g., maximized processing speed) or environment (e.g., noise level). Traditional attempts at processor control typically have limited or no consideration for impacts of frequency, voltage and/or temperature adjustments on maximizing performance while maintaining overall lifetime reliability.

SUMMARY

The present invention facilitates enhanced processor performance with minimal impact to reliability by maintaining conservation of average processor lifetime. The performance enhancement and reliability maintenance system and method of the present invention pushes a processor to its maximized performance capabilities when processing intensive tasks (e.g., 3D graphics, etc) are performed. For example, a clock signal frequency and power signal voltage are increased until an unacceptable error rate begins to appear in the processing results and then the clock signal frequency and power signal voltage are backed off to the last setting at which excessive errors did not occur. The voltage should not be set to a level high enough to cause catastrophic failure. The present invention is readily expandable to provide adjustment for a variety of operating conditions (e.g., voltage, frequency, temperature) in response to task performance requirements. The present invention also includes the ability to throttle back settings which facilitate the maintenance of desired reliability standards. The periods at which the processor is "overstressed" are averaged with the periods at which it is "understressed" to provide an acceptable mean time to processor life failure.

In one embodiment, a test (e.g., an auto self test) is run to examine the performance of a chip and to determine if characteristics of the chip are changing over time. In one exemplary implementation, the auto self test includes running a performance test suite (e.g., a "Schmoo" test) to characterize operating conditions (e.g., temperature, voltage, clock-frequency) at which a chip can operate without producing errors at unacceptable rates. The components of a present inventive computer system can also be binned at several levels before shipment permitting even greater refinement of the field throttling activities. This permits chip performance characteristics to be adjusted within finer tolerances associated with each binning group.

A set of per-chip settings can be generated by a test suite that characterizes processor performance for a variety of operating condition setting ranges for a particular board and chip combination, and these settings can be programmed into the BIOS at shipment, with each chip or board having its own sets of settings. In one embodiment, the BIOS can include a model of how the chip is expected to degrade over time as a function of temperature, clock speed and voltage. In another embodiment, the BIOS-stored settings can include "tweak" factors or adjustments such as a trimmer (e.g., that adjusts the position of clock edges relative to data), a shaper (e.g., that adjusts pulse widths), and edge rate adjustments. The present invention is also readily expandable to factor hardware self test results into operating condition or parameter adjustments (e.g., adjusting voltage, frequency, temperature, etc.).

DESCRIPTION OF THE DRAWINGS

The accompanying drawings, which are incorporated in and form a part of this specification, are included for exemplary illustration of the principles of the present and invention and not intended to limit the present invention to the particular implementations illustrated therein. The drawings are not to scale unless otherwise specifically indicated.

FIG. 4 is a flow chart of a processor performance limitation testing method in accordance with one embodiment of the present invention.

FIG. 5 is a flow chart of a processor temperature compensation method, one embodiment of the present invention.

DETAILED DESCRIPTION

Figure 1:
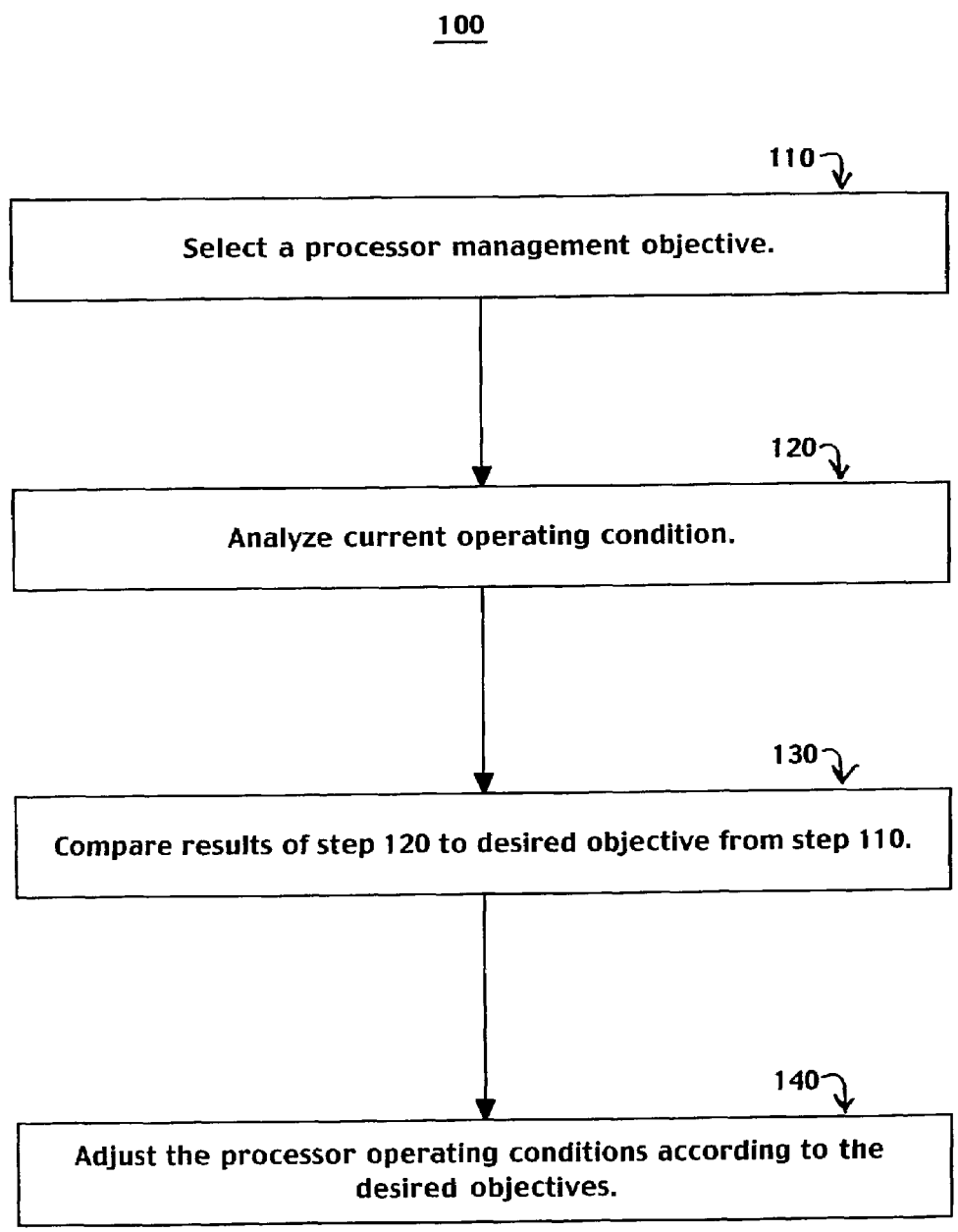
FIG. 1 is a flow chart of a graphics processor management method in accordance with one embodiment of the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one ordinarily skilled in the art that the present invention may be practiced without these specific details. In other instances, well known methods, procedures, components, and circuits have not been described in detail as not to unnecessarily obscure aspects of the current invention.

Some portions of the detailed descriptions which follow are presented in terms of procedures, logic blocks, processing, and other symbolic representations of operations on data bits within a computer memory. These descriptions and representations are the means generally used by those skilled in data processing arts to effectively convey the substance of their work to others skilled in the art. A procedure, logic block, process, etc., is here, and generally, conceived to be a self-consistent sequence of steps or instructions leading to a desired result. The steps include physical manipulations of physical quantities. Usually, though not necessarily, these quantities take the form of electrical, magnetic, optical, or quantum signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are associated with the appropriate physical quantities and are merely convenient labels applied to these quantities. Unless specifically stated otherwise as apparent from the following discussions, it is appreciated that throughout the present application, discussions utilizing terms such as "processing", "computing", "calculating", "determining", "displaying" or the like, refer to the action and processes of a computer system, or similar processing device (e.g., an electrical, optical, or quantum, computing device), that manipulates and transforms data represented as physical (e.g., electronic) quantities. The terms refer to actions and processes of the processing devices that manipulate or transform physical quantities within a computer system's component (e.g., registers, memories, other such information storage, transmission or display devices, etc.) into other data similarly represented as physical quantities within other components.

The present invention facilitates enhanced processor performance with minimal impact to reliability by maintaining conservation of average processor lifetime. The present invention directs adjustments in the characteristics or operating conditions of a processor (e.g., clock speed, voltage, temperature, etc.) in response to various criteria (e.g., proposed tasks, temperature measurements, detected errors, etc.). While the present invention is readily adaptable to accommodate maximization of a single objective, the more sophisticated implementations include adjustments directed at balancing several objectives. For example, an implementation in which adjustments are made to provide maximized performance (e.g., increase clock frequency and voltage) for complex tasks involving intensive processing (e.g., three dimensional graphics, video games, etc.) and other adjustments (e.g., decreases in clock frequency and voltage) are made to provide resource conservation when relatively less complex tasks (e.g., word processing, sleep mode, etc.) are performed.

Figure 9A:
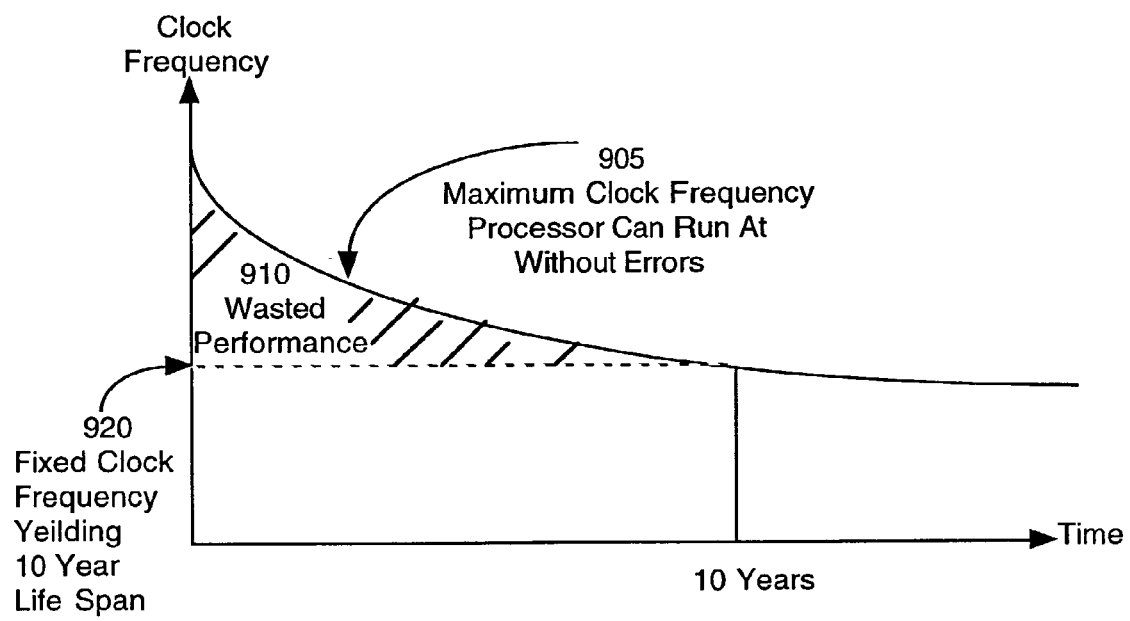
FIG. 9A is one exemplary graphical representation illustrating "wasted performance" capabilities when operating a processor at a fixed clock frequency under potential maximum clock frequency values at which a processor can run at without errors
Figure 9B:
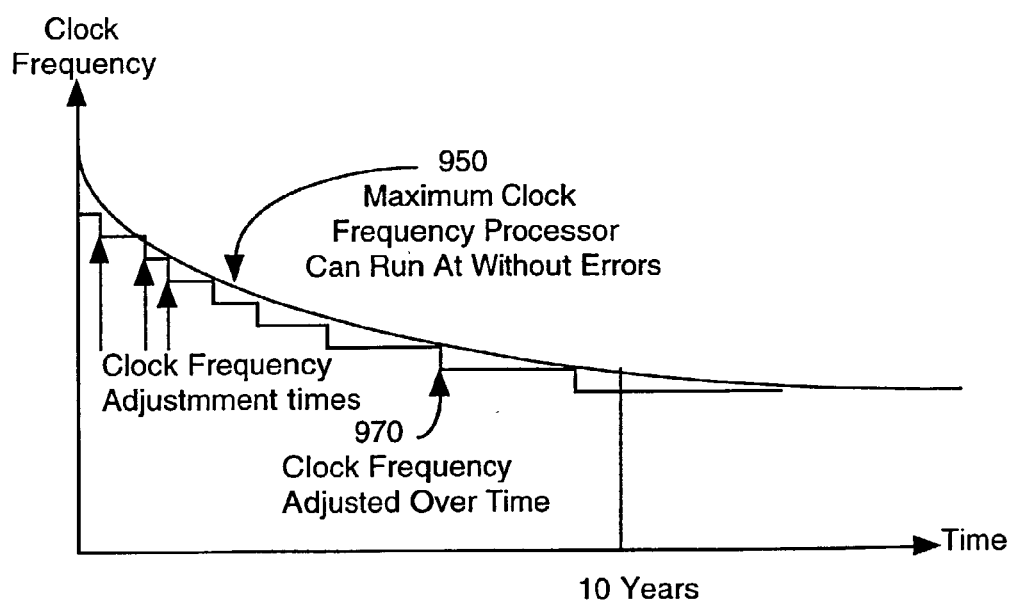
FIG. 9B is one exemplary graphical representation illustrating "enhanced" performance available by making clock frequency adjustments over time.

The performance enhancement and reliability maintenance system and method of the present invention pushes a processor to its maximized performance capabilities when processing intensive tasks (e.g., 3D graphics, etc) are performed. For example, a clock speed and/or voltage are increased until an unacceptable error rate begins to appear in the processing results and then the clock speed and voltage are backed off to the last setting at which excessive errors did not occur. This is a significant advantage over previous voltage and/or clock speed adjustment implementations which do not run a processor at its full performance potential. FIG. 9A is one exemplary graphical representation illustrating "wasted performance" capabilities 910 under the curve 905 of maximum clock frequency values at which a processor can run at without errors when a processor is run at fixed clock frequency 920 that yields a 10 year "life span" of reliable performance. FIG. 9B is one exemplary graphical representation illustrating "enhanced" performance available by making clock frequency adjustments (e.g., 970) over time. The present invention is readily expandable to provide adjustment for a variety of operating conditions in response to task performance requirements. For example, a variable speed fan that is software controlled can be adjusted to alter the temperature of the processor in addition to alterations to a clock signal frequency or power signal voltage.

The present invention also includes the ability to throttle back settings which facilitates the maintenance of desired reliability standards. The periods at which the processor is "overstressed" are averaged with the periods at which it is "under-stressed" to provide an acceptable mean time to processor life failure. This technique allows the hardware to be run at a higher voltage than the semiconductor manufacturer's maximum specified voltage. In one embodiment, increased degradation of the chip during high performance settings is offset by slower degradation when the chip is not run in high performance mode (e.g., when the voltage is lower, the clocks are slower, and the temperature is lower).

In one embodiment, another processor runs a software-controlled test to examine the performance of a chip and to determine if characteristics of the chip are changing over time. In one exemplary implementation, the test includes running a performance test suite (e.g., a "Schmoo" test) to characterize operating conditions (e.g., temperature, voltage, clock-frequency) at which a chip can operate without producing errors at unacceptable rates. For example, for a system with a CPU coupled to a graphics processor, software running on the CPU (e.g., the graphics driver software) controls a test on at least part of the graphics processor (when the corresponding portion of the graphics processor is not being utilized for other activities), thereby facilitating periodic adjustment of the operating conditions or parameters in response to the test results. The present invention is readily adaptable to running the test at various times and/or in response to various events. For example, the test can be run during bootup, immediately after the screen saver turns on or off, or when the hardware observes an error. Characterization of the hardware operating conditions can be "hidden" in a driver download process (e.g., when done over the web), and a particularly extensive characterization could be done at driver download time. In an alternate embodiment, a self test can be performed by the graphics processor, independent from the CPU and the driver.

The components of a present invention computer system are binned at several levels before shipment permitting even greater refinement of the field throttling activities. Binning the components facilitates compensation for deviations (e.g., different operation speeds) in component characteristics due to numerous variables that can impact component manufacturing (e.g., semiconductor fabrication processes). The processor chips and memory chips are individually binned (e.g., into two or more speed categories) and then boards comprising a combination of processor chips and memory chips are binned on a board by board basis. This permits chip performance characteristics to be adjusted within finer tolerances associated with each binning group. It also permits creation of very high performance boards, which can be sold at higher process. For example, a per chip BIOS setting comprising a test suite that characterizes operating condition settings ranges for a particular board and chip combination can be programmed into the BIOS or non volatile memory (e.g., EPROM, flash ROM, EEROM, NVROM, etc.) at shipment. In one embodiment, the BIOS can include a model of how the chip is expected to degrade over time as a function of temperature, clock speed and voltage. If the test suite results indicate that the chip is degrading faster than acceptable reliability requirements, the present reliable performance maximizing system and method can reduce and/or cease the "overstressing" operational modes. The BIOS-stored settings can include "tweak" factors or adjustments such as a trimmer (e.g., that adjusts the position of clock edges relative to data), a shaper (e.g., that adjusts pulse widths), and edge rate adjustments. In one exemplary implementation, the settings and model data are stored in the BIOS and the tests are hidden in drivers.

Another feature of the present invention is the ability to automatically run testing suites and adjust the factors stored in the BIOS in the field, if required. The present invention is also readily expandable to factor hardware test results into operating condition or parameter adjustments (e.g., adjusting voltage, frequency, temperature, etc.). For example, hardware for self test within the chip periodically takes over use of the chip, generates input data, and analyzes output data. Typically, for self test, input data will be pseudo-randomly generated, and output data analyzed by signature analysis.

The present invention also facilitates maintenance of a processor temperature within acceptable ranges that minimize overheating damage to the processor. In one embodiment, a present invention temperature maintenance system includes a temperature sensor that senses the temperature of the processor. This sensor can take the form of an on-chip diode and an off-chip voltage-to-temperature measuring device, the device being programmable to set an indicator when any of a plurality of temperature thresholds is crossed. When the temperature sensor senses the processor temperature approaching undesirable levels one or more adjustments are performed. For example, the adjustment can include automatically modulating the frequency of a clock signal associated with the processor. The frequency can be decreased (without software intervention) if the temperature rises beyond a predetermined value or the frequency can be increased to achieve greater performance if the temperature drops below the predetermined value. Voltage can be similarly increased or decreased in response to crossing a temperature threshold. In addition, an interrupt can be generated that causes software to take additional actions to tune the clock frequency in response to temperature measurements.

Adjustments to the fan operations can also be made to increase cooling when required (e.g., temperature increases beyond predetermined values) or to run in a quiet mode when cooling is not required. In one embodiment, a processor can be configured to run in at least two modes, a quiet mode and a performance mode. In the quiet mode performance is reduced to minimize fan operation as much as possible. In performance mode the fan is directed to operate in a manner that facilitates achievement of maximum performance. The present invention can control a variable fan to provide just enough cooling for a particular application while minimizing noise. In one exemplary implementation, a driver can automatically select between the modes depending on the type of application programs that are running. Alternatively, a user can select the mode via a control panel.

In one embodiment the present invention provides temperature control via pulse width modulation of the clock signal. For example, a clock speed (e.g., clock signal frequency) adjustment circuit picks a variable amount of clock pulses out of 256 clock pulses and removes the rest. This allows an almost continuously variable average clock rate, and allows smooth transitions between clock frequencies. It is appreciated that the present invention can also utilize pulse width modulation to alter other operating conditions including controlling the duty cycle of component (e.g., a clock, a fan, etc).

FIG. 1 is a flow chart of graphics processor management method 100, one embodiment of the present invention. Graphics processor management method 100 facilitates enhanced processor performance with minimal impact to reliability by maintaining conservation of average processor lifetime. The present invention directs adjustments in the characteristics or operating conditions of a processor (e.g., clock speed or frequency, voltage, temperature, etc.) in response to various criteria (e.g., proposed tasks, temperature measurements, detected errors, etc.). In one embodiment of the present invention, graphics processor management method 100 enables the processor to increase performance for intensive information processing activities and conserve resources during tasks that do not require a large amount of information processing. In one exemplary implementation, graphics processor management method 100 assists noise reduction by directing operations in a quiet mode. It is also appreciated that the present invention can be readily implemented in conjunction with a variety of processors (e.g., a central processing unit, etc.).

In step 110, a desired processor management objective is selected. The present invention is readily adaptable to a variety of objectives, including maximum performance, conservation of reliability, temperature regulation, power conservation and/or noise abatement (e.g., quiet mode). In one embodiment of the present invention, the processor management objective is to obtain maximum performance with accurate results for a particular application task or type of task (e.g., graphics intensive tasks, three dimensional image rendering, etc.). The processor management objective may also be to conserve lifetime operating reliability of the processor while providing accurate results for an application task or type of task (e.g., graphics minimal tasks, sleep mode, word processing, etc.). In one exemplary implementation of the present invention, the processor management objective includes maintenance of a relatively low processor temperature. In yet another exemplary implementation, the processor management objective is to maintain relatively quiet operation. The present invention is also readily adaptable for the inclusion of power conservation concerns.

In step 120, an operating condition of a processor is analyzed. In one embodiment of the present invention, the analysis includes an examination of processor performance. For example, the analysis can include determining the complexity of the task the processor is performing, the speed at which it is performing the task and the accuracy of the results (e.g., including the amount and/or type of errors). In one exemplary implementation, the analysis includes an examination of the temperature of the processor. In one embodiment of the present invention, the analysis includes examination of external component settings associated with the processor (e.g., a control setting for a cooling fan).

In step 130, the operating condition results of the step 120 analysis are compared to operating conditions associated with the desired management objective from step 110. In one embodiment of the present invention, the processor performance (e.g., at a particular time or for performance of a specific task) is compared to a desired processor performance level. For example, the speed (e.g., clock signal frequency) at which a processor is performing a task is compared to a desired speed for that task. In one exemplary implementation, the desired speed is indicated to be the maximum speed at which the processor can operate without introduction of an excessive error rate. In an alternate embodiment, the desired speed can be predetermined value based upon the task being performed. In one exemplary implementation, the analysis results from step 120 are compared to objectives associated with support components for the processor. For example, a comparison is made to values associated with running a support fan in quiet mode (e.g., is the control setting for the cooling fan within a quiet mode range).

In step 140, the processor operating conditions are adjusted according to the desired objectives. In one embodiment of the present invention, the frequency of a clock signal and voltage level of a power signal are adjusted (e.g., increased or decreased). The magnitude and direction of the frequency and voltage adjustment corresponds to the desired objective from step 110. For example, if the desired objective is to obtain maximum performance with accurate results for a particular application task (e.g., graphics intensive tasks, three dimensional image rendering, etc.) then the frequency and voltage level can be increased (e.g., to a point just before errors begin to occur) for the performance of those specific application tasks. If the desired objective is to conserve lifetime operating reliability of the processor during other specific low performance application tasks (e.g., graphics minimal tasks, sleep mode, word processing, etc.), then the frequency and voltage level can be reduced (e.g., to a point just before errors begin to occur and/or to a point where performance is sufficient for the task) during the performance of the specific low performance application tasks. In one embodiment of the present invention, a temperature operating condition of the processor is altered. For example, the temperature operating condition of a processor can be altered by changing a clock frequency, generating an interrupt that causes software to take additional actions, and/or directing a fan to provide more or less cooling.

It is appreciated that there are a variety of possible management objectives and corresponding operating condition alterations that are readily implemented by the present invention via numerous mechanisms. The present invention is readily adaptable to accommodate setting operating conditions to achieve multiple objectives with varying priority. In one exemplary implementation, changes in operating conditions are constrained by a combination of various factors including production of erroneous results, impact on lifetime reliability, actual temperature measurements, and noise levels. For example, a clock frequency can be increased for greater performance, wherein the increases continue until erroneous results are produced or until a specific temperature is reached, at which point the clock frequency can be reduced to a point at which the erroneous results do not occur or the temperature is at an acceptable level. In one embodiment, a fan can be instructed to adjust operations to provide greater cooling while the clock rate is increased. The fan adjustment can be limited by a noise factor restriction or the rate which the processor performs the task can be designated as having a higher priority than noise abatement and the fan operation is not limited by a noise factor.

The balancing of multiple management objectives with different priorities can occur in a variety of implementations. Exemplary implementations can include management objectives that change over time. For example, a first management objective of maintaining a predetermined level of reliability can have a fixed high priority. A second management objective of maximizing operating conditions (e.g., increase clock signal frequency, increase power signal voltage, direct fan operations to provide increased cooling, etc.) for high performance tasks can have a lower variable priority. In one embodiment of the present invention, a reliability maintenance test is performed. For example, a reliability maintenance test can include measuring a processor's degradation and comparing it to an acceptable degradation rate and if the measured values exceed the acceptable values the priority of the second management objective to maximize operating conditions can be lowered even further. Alternatively, the second management objective can be changed so that it is active for even a smaller number of high performance tasks or it can be "turned off" (not implemented) until a subsequent reliability maintenance test indicates the processor is within an acceptable degradation rate.

In one embodiment of the present invention, adjustments are made to operating conditions of components other than a processor. For example, in addition to making adjustments to a processor in step 140 operating conditions of a memory are also adjusted. In one exemplary implementation, a clock for a processor (e.g., a core clock) and a memory clock are independent and adjusted differently. Although adjusted differently (e.g., one increased and the other decreased) the adjustments can be coordinated to reach a desired objective. For example, depending upon detected error conditions or the type of processing occurring, the processor clock signal frequency can be increased and the memory clock signal frequency decreased or vise versa.

Figure 2:
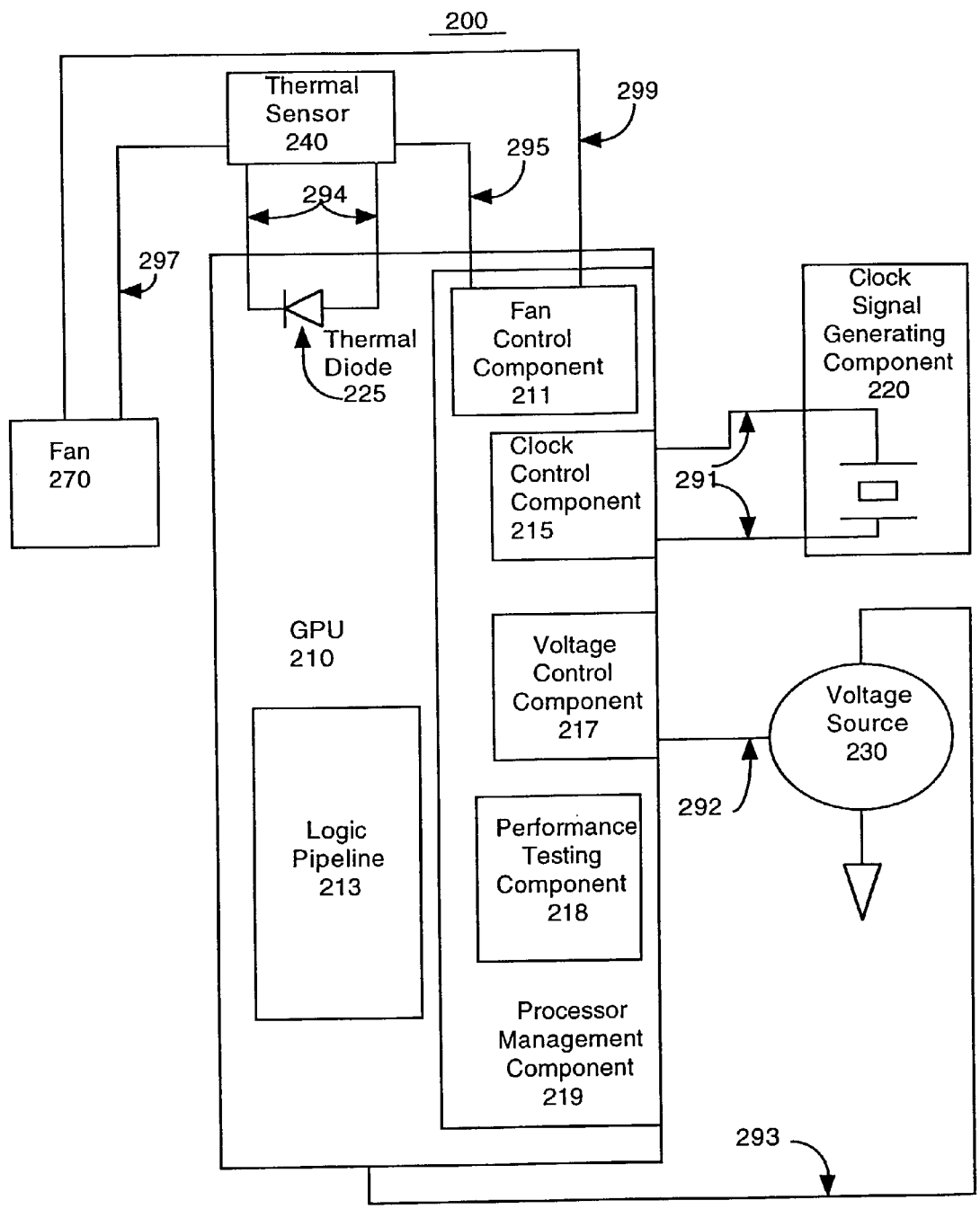
FIG. 2 is a block diagram of a graphics processor adjustment system in accordance with one embodiment of the present invention.

FIG. 2 is a block diagram of graphics processor adjustment system 200, one embodiment of the present invention. Graphics processor system 200 includes graphics processing unit (GPU) 210, clock signal generator 220, voltage source 230, thermal sensor 240 and fan 270. Graphics processing unit 210 includes thermal diode 225 and processor management component 219 which comprises a fan control component 211, clock control component 215, voltage control component 217 and performance testing component 218. The processor management component 219 can also comprise software running on a CPU. The graphics processing unit 210 generally also includes logic pipeline 213 for performing graphics rendering as know in the art, including, for example, geometry processing and pixel processing. Graphics processing unit 210 is coupled to clock signal generator 220, voltage source 230, thermal sensor 240 and fan 270. It is appreciated that components in the present invention can be implemented in hardware, software, firmware and/or combinations thereof. It is also appreciated that the present invention can be readily implemented in conjunction with a variety of processors (e.g., a central processing unit, etc.).

The components of graphics processor adjustment system 200 cooperatively operate to provide graphics processor performance adjustment. Graphics processing unit 210 performs processing tasks. Clock signal generating unit 220 generates a clock signal 291 for GPU 210. In one embodiment, clock signal generating unit 220 is included in GPU 210 (e.g., there is an external clock generator which is multiplied up by an internal programmable phase lock loop circuit). Voltage source unit 230 generates a power signal 293 for GPU 210. Thermal sensor 240 senses temperatures associated with GPU 210. Fan 270 provides cooling air for GPU 210. Processor management component 219 controls the operating conditions of GPU 210. Performance testing component 218 periodically tests the performance of GPU 210, and can be implemented with, for example: (i) a set of error checking circuits distributed at various points within the logic 213; (ii)

pseudo-random number generator for creating input data; (iii) signature analysis logic for verifying a sequence of output values; (iv) software running on a CPU; (v) software running within the GPU 210; and/or (vi) external circuits that check outputs from the GPU. Voltage control component 217 controls (e.g., via voltage control signal 292) the voltage level of the power signal 293 (e.g., within an envelope of settings or values determined by the performance testing component 218). Clock control component 215 controls the frequency (or, average frequency a described above) of internal GPU clock signals (e.g., within an envelope of settings or values determined by the performance testing component 218). In one exemplary implementation, the power signal voltage and the clock signal frequency are increased for high performance tasks and reduced for low performance tasks of GPU 210.

In one embodiment of the present invention, adjustments to operating conditions are not necessarily made in response to every test result indication of an error occurring. In one exemplary implementation, indications of a non critical error occurring in a logic 213 (e.g., a graphics pipeline) do not trigger an operating condition adjustment unless a predetermined unacceptable level of errors in the logic occurs. For example, error checking in a graphics pipeline may indicate a relatively few pixel errors that do not have an appreciable impact on visual perception of the graphics and thus an operation condition adjustment (e.g., decreasing a clock signal frequency) is not done at the low error rate. When detected errors cross a threshold, or the rate of errors cross a threshold, a condition adjustment may be immediately done. Or, when one of these thresholds is crossed, a test can be performed to determine new operating conditions.

The determination of processing or operating condition adjustments by processor management component 219 includes various factors. In one embodiment of the present invention, processor management component 219 determines that a high performance task (e.g., a three dimension graphics application task) or low performance task is being performed and instructs clock control component 215 to increase the clock signal frequency for high performance tasks and reduce the clock signal frequency for low performance tasks. Processor management component 219 can also instruct voltage control component 217 to increase the voltage level of power signal 293 for high performance tasks and reduce the voltage level for low performance tasks. In one embodiment, the processor management component 219 instructs the fan to adjust its operation to provide greater cooling capacity for high performance tasks and lesser cooling capacity for lower performance tasks. The control signal to the fan can be communicated directly from a temperature sensing component (e.g., 240) or from the processing unit (e.g., from fan control component 211). The performance nature (e.g., high or low, etc.) of a task may be determined by a variety of measures (e.g., user defined, defined by an application program executing the task, preprogrammed, etc.). In one embodiment of the present invention, an operating condition (e.g., the frequency of the clock signal and/or voltage level of a power signal) is adjusted based upon user demanded performance. In another embodiment, the processor management component 219 receives information on the type of application programs being run on the system, and then determines how to set various operating conditions for the GPU 210.

The present invention is readily adaptable to embodiments comprising components for providing a plurality of similar operating condition controls. In one embodiment the present invention includes multiple voltage sources and clock signal generators with respective voltage control components and clock control components. In one exemplary implementation, a plurality of voltages and clock signals are provided to different parts of the processor. It is also appreciated that the present invention is readily implemented in systems in which various inputs are provided to processor management component 219 from other components and/or processor management component 219 provides direction to other components. For example, processor management component 219 can receive testing inputs from other components (e.g., a memory ECC component, a driver test component) and utilize this information in directing operating condition changes. As indicated above, testing may be performed on a relatively frequent basis and operating condition adjustments implemented less frequently based upon a predetermined number of unacceptable errors occurring. In one exemplary implementation, the type of error (e.g., a critical CPU error versus a GPU pixel error) is considered in addition to the number of errors before making an operating condition adjustment. In addition, processor management component 219 can direct other components (e.g., an external circuit, an external fan controller, etc.) to make adjustments in an operating condition.

There are a variety of tests that can be implemented by performance testing component 218 to determine if the processor is failing. In one embodiment of the present invention, the tests determine a maximum operating condition (e.g., voltage level, clock frequency, temperature or combination thereof) and a minimum operating condition at which graphics processing unit 210 begins to fail. In one exemplary implementation, an operating condition is altered and then performance testing component 218 directs the processor to perform an operation and runs a diagnostic suite. For example, if a graphics process renders bad or erroneous pixel information the performance component 218 can detect it. The contents of a memory location storing the rendered pixel information is checked after a graphics process is performed and compared to correct image information. In one embodiment the test suite is run on state transitions (e.g., power up, power savings mode, speed transition, when an application is started, etc.). In one embodiment, a test initiation program is running in the background looking for an indication of a problem (e.g., a fatal error, strange error, predetermined type of error, etc.). For example, the test initiation program running in the background during an image rendering operation tracks data anomalies during error checking (e.g., a string of errors) and initiates a performance test suite if certain types of anomalies occur. In one embodiment, graphics processor adjustment system 200 also includes a memory for storing instructions for the processor management component 219. For example, the memory stores test suite instructions for performance testing component 218.

Figure 6:
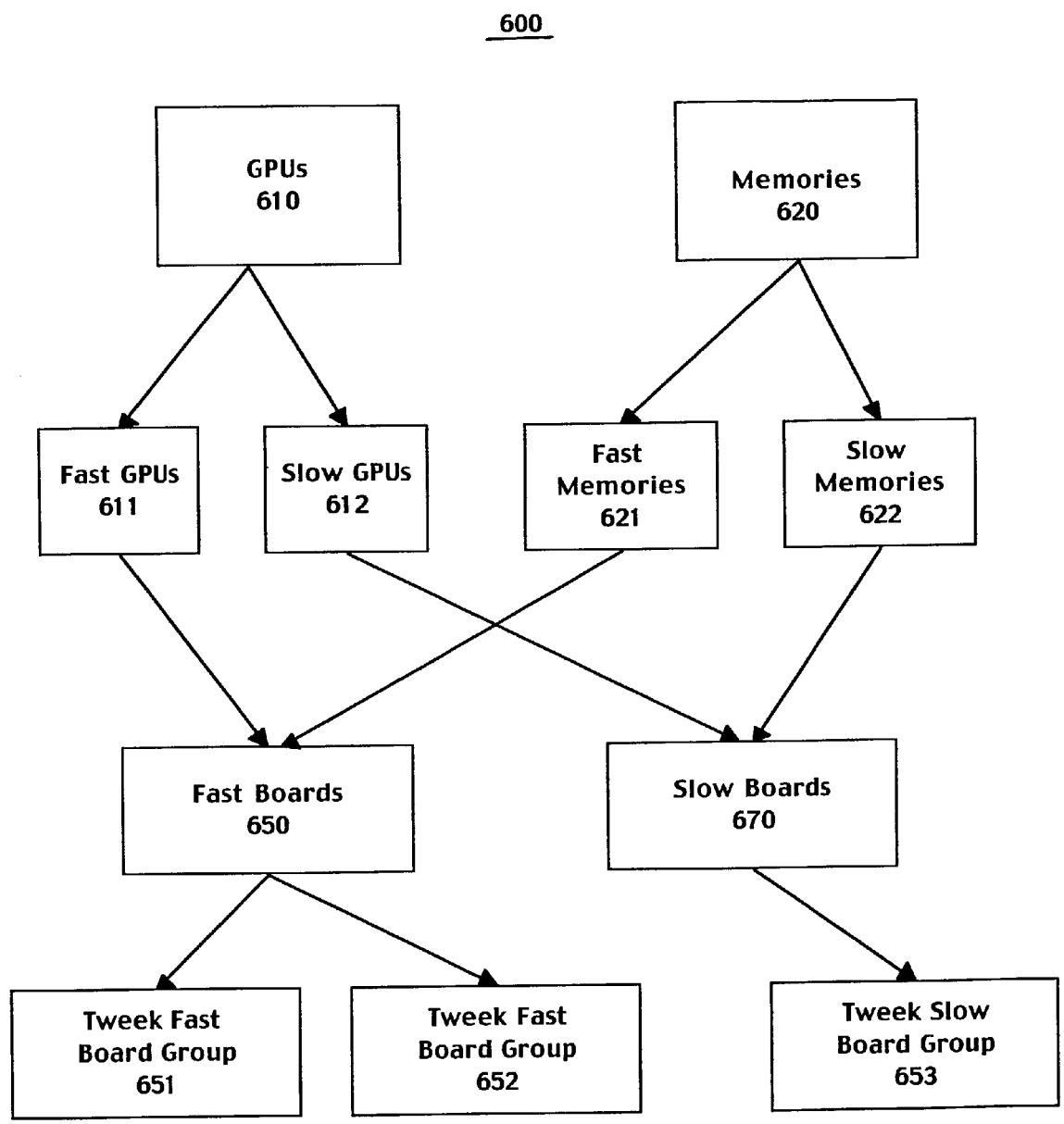
FIG. 6 is an illustration of one exemplary implementation of a binning process utilized to bin graphics processors and memory in one embodiment of the present invention.

In one exemplary implementation, the test suite instructions and models of processor characteristics are included in a basic input output system (BIOS). The test suite instructions can be based upon binning of the graphics processor unit and the memory on an individual and combined board basis. FIG. 6 is an illustration of one exemplary implementation of a binning process 600 utilized to bin graphics processors and memory in one embodiment of the present invention. The GPUs in bin 610 are tested and the memories in bin 620 are tested. The fast GPUs and fast memories are sorted into bins 611 and 621 respectively and then combined on a board and placed in fast board bin 650. The slow GPUs and slow memories are sorted into bins 612 and 622 respectively and then combined on a board and placed in slow board bin 670. The fast boards in bin 650 are tweaked and placed in a tweaked fast board group (e.g., 651 or 652). The slow boards are tweaked and placed in a tweaked slow board group (e.g., 653). In an alternate embodiment, the slow boards are not tweaked.

Figure 7A:
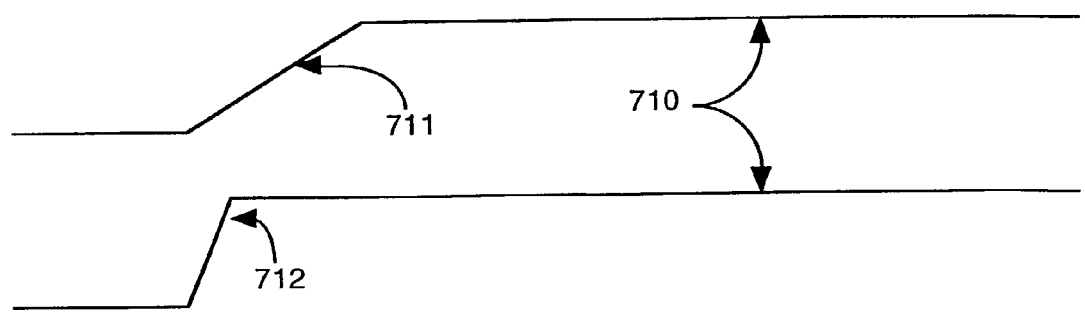
FIG. 7A illustrates an edge rate adjustment to a clock signal in accordance with one embodiment of the present invention.
Figure 7B:
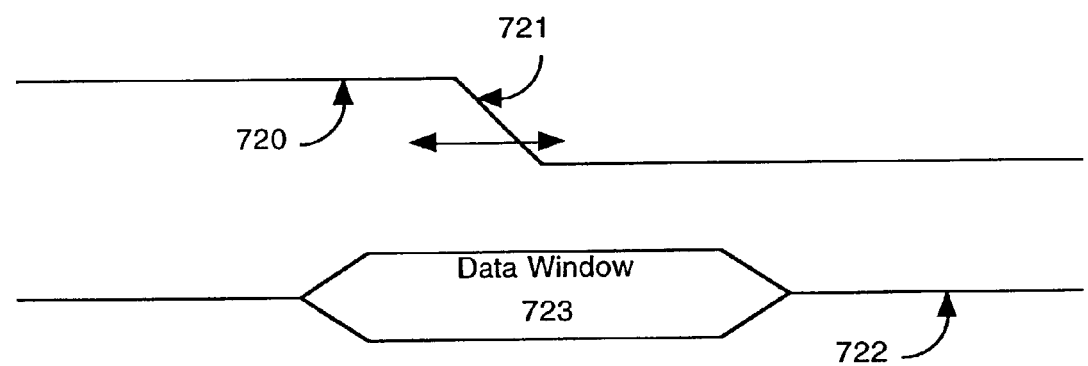
FIG. 7B illustrates a trimmer adjustment to a clock signal in accordance with one embodiment of the present invention.
Figure 7C:
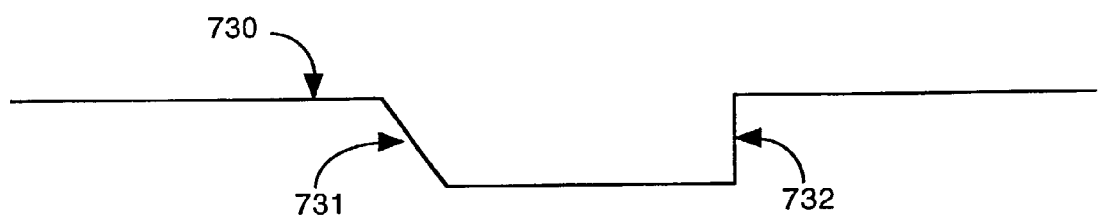
FIG. 7C is an illustration of a shaper adjustment to a clock signal in accordance with one embodiment of the present invention.

There are a variety of "tweaking" processes that are readily adaptable for use in making adjustments to processor operating conditions in accordance with the present invention. FIG. 7A illustrates an edge rate adjustment to clock signal 710 in accordance with one embodiment of the present invention. Signal 710 has a slow silicon clock signal edge 711 before the edge rate adjustment and signal 710 has a fast silicon clock signal edge 712 after the adjusting. In one embodiment of the present invention, the edge rate adjustment includes adjustments to a number of drivers utilized to drive the signal. For example, more drivers are turned on or enabled to increase the slope of the clock signal (e.g., clock signal edge 711) and achieve a "faster" signal. Alternatively, drivers can be disabled to decrease the slope of the clock signal (e.g., clock signal edge 721) and achieve a "slower" signal. FIG. 7B illustrates a trimmer adjustment to clock signal 720 in accordance with one embodiment of the present invention. The clock signal 720 is moved relative to a data window 723 associated with a transition in data signal 722. In one exemplary implementation, the clock signal 720 is adjusted to be in the middle of the data window 723. FIG. 7C is an illustration of a shaper adjustment to clock signal 730 in accordance with one embodiment of the present invention. In one embodiment of the present invention, the shaper adjustment includes varying the duration of a low pulse in the clock signal. In one exemplary implementation, the clock transition edge 731 is held "fixed" and the clock transition edge 732 is moved relative to edge 731. The adjustment factors utilized in the binning process can be loaded into the BIOS and also utilized in changing operating conditions.

Figure 10A:
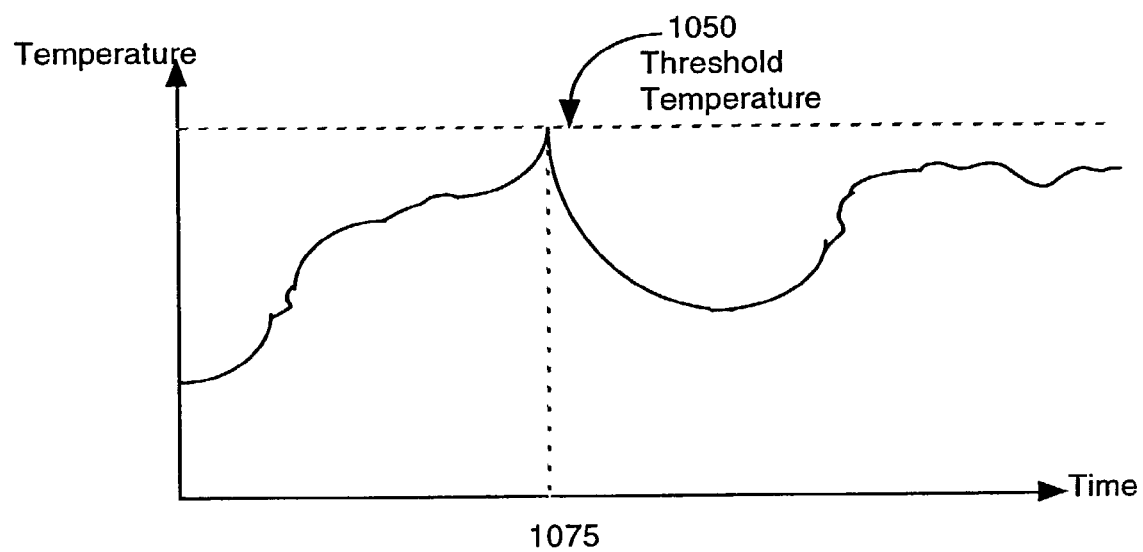
FIG. 10A is a graphical illustration of an exemplary increase and decrease in temperature of a processor over time.
Figure 10B:
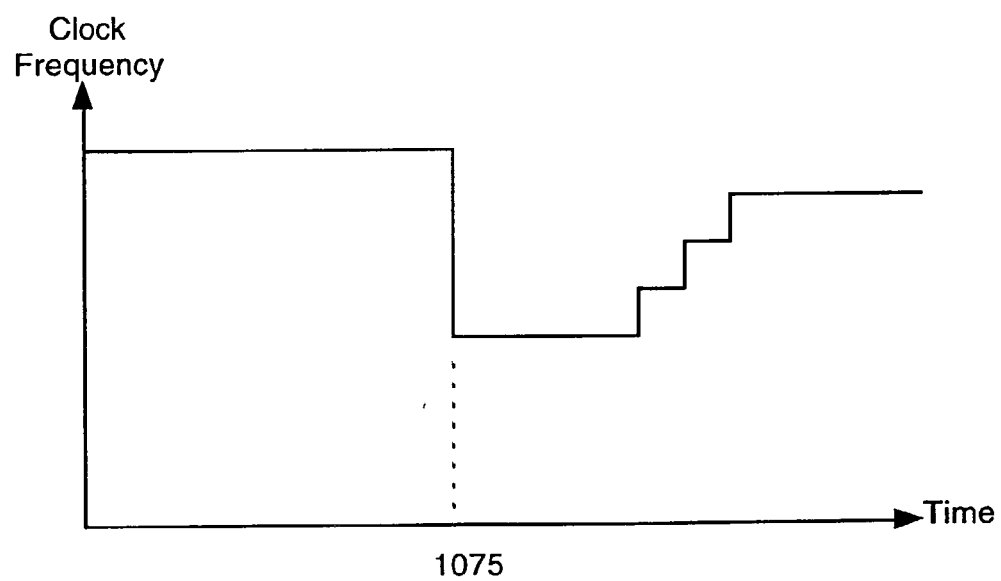
FIG. 10B is a graphical illustration of an exemplary adjustment in a clock signal frequency corresponding to an exemplary increase and decrease in temperature of a processor over time.

The present invention also facilitates maintenance of a processor temperature within particular ranges. For example, maintaining processor temperature within acceptable ranges that minimize overheating damage to the processor. In one embodiment, a present invention temperature maintenance system includes a temperature sensor that senses the temperature of the processor. This sensor can take the form of an on-chip diode (e.g., 225) and an off-chip voltage-to-temperature measuring device (e.g., 240), the device being programmable to set an indicator when any of a plurality of temperature thresholds is crossed. When the temperature sensor senses the processor temperature approaching undesirable levels one or more adjustments are performed. The frequency can be decreased (e.g., without software intervention) if the temperature rises beyond a predetermined value or the frequency can be increased to achieve greater performance if the temperature drops below the predetermined value. FIG. 10A is a graphical illustration of an exemplary increase and decrease in temperature of a processor over time and FIG. 10B is a graphical illustration of an exemplary corresponding adjustment in an average clock signal frequency. For example, when the temperature of the processor reaches a temperature threshold value 1050 at time 1075 a corresponding adjustment decreasing the clock frequency is implemented at time 1075. Voltage levels can be similarly increased or decreased in response to crossing a temperature threshold.

In one embodiment of the present invention, a set of fan control rules direct adjustments associated with a fan. The fan control rules can be utilized to achieve a various objectives by providing multiple sets of fan control rules. A set of fan control rules can be utilized to control temperature. For example, a set of fan control rules can direct a fan to provide additional cooling when a temperature sensor senses an increase in a processor temperature and reduce fan cooling operations when a temperature sensor senses a decrease in a processor temperature. A different set of fan control rules can be utilized for different operational modes (e.g., performance mode and quiet mode). For example, for high performance mode, the set of fan rules can include directions to adjust cooling provided by a fan, but to have the fan continuously running. Also for example, in quiet mode, a set of fan control rules can direct fan to be turned off unless a threshold temperature is crossed.

In one embodiment of the present invention, an interrupt can be generated in response to a temperature measurement. The interrupt can cause software to take additional actions to tune the clock frequency in response to temperature measurements. For example, the adjustment can include automatically modulating the frequency of a clock signal associated with the processor. In one embodiment, a pulse width modulation (PWM) control can be implemented in which multiple clock speeds are provided within a defined period. For example, a period of 64 microseconds is divided into 256 pulse intervals and for a portion of the 256 pulses the clock is run at a faster speed relative to the remaining portion of 256 pulses. This allows an almost continuously variable clock rate and smooth transitions between clock frequencies. In one embodiment of the present invention, the clock frequency is initially cut to a fraction (e.g., ½, ¼, etc.) of its nominal frequency upon the indication of a temperature problem and then a transition is made to a pulse width modulation control within a relatively quick time frame. The ability to select between a variety of fractional frequencies and/or pulse width modulation settings permits adjustments to meet performance requirements.

The present invention also facilitates adjustments to external components that impact processor operating conditions. Adjustments to the fan operations can also be made to increase cooling when required (e.g., temperature increases beyond predetermined values). In one embodiment of the present invention, a temperature sensing component (e.g., 240, 225, etc) senses the junction temperature of the graphics processing unit and a temperature response mechanism controls the temperature of the graphics processing unit. For example, the temperature is maintained within ranges according to performance and reliability maintenance requirements. In one exemplary implementation, the temperature response mechanism includes a clock frequency control mechanism (e.g., clock control component 215) which adjusts the frequency of a clock signal (e.g., 291) supplied to the graphics processing unit in response to the junction temperature. In yet another exemplary implementation, the temperature response mechanism includes a voltage level control mechanism (e.g., voltage control component 217) which adjusts the voltage level of a power signal supplied to the graphics processing unit in response to the junction temperature. In one embodiment, the fan control mechanism adjusts the operation of the fan (e.g., fan 270) in accordance with instructions from the temperature response mechanism based upon the junction temperature.

It is appreciated that the present invention is readily adaptable for a variety of temperature control implementations. For example, thermal diode 225 can be communicatively coupled to thermal sensor 240 by communication bus 294. Communication bus 294 can include a temperature indication signal that indicates a temperature condition of GPU 210. Thermal sensor 240 can be communicatively coupled to GPU 210 (e.g., to fan control component 211) by communication bus 295. Communication bus 295 can communicate a thermal indication signal. When the thermal indication signal is asserted the measures are taken to cool down the processor (e.g., a clock frequency is reduced, a software interrupt is initiated, fan operations are adjusted to increase cooling, etc.). In one embodiment of the present invention, communication bus 295 is also utilized to program thermal sensor 240. In one exemplary implementation, thermal sensor 240 can control the fan via communication bus 297 or alternatively fan control component 211 can control the fan via communication bus 299. The communication buses utilized in thermal control can include a variety of implementations (e.g., I²C, SMBus, etc.).

Figure 3:
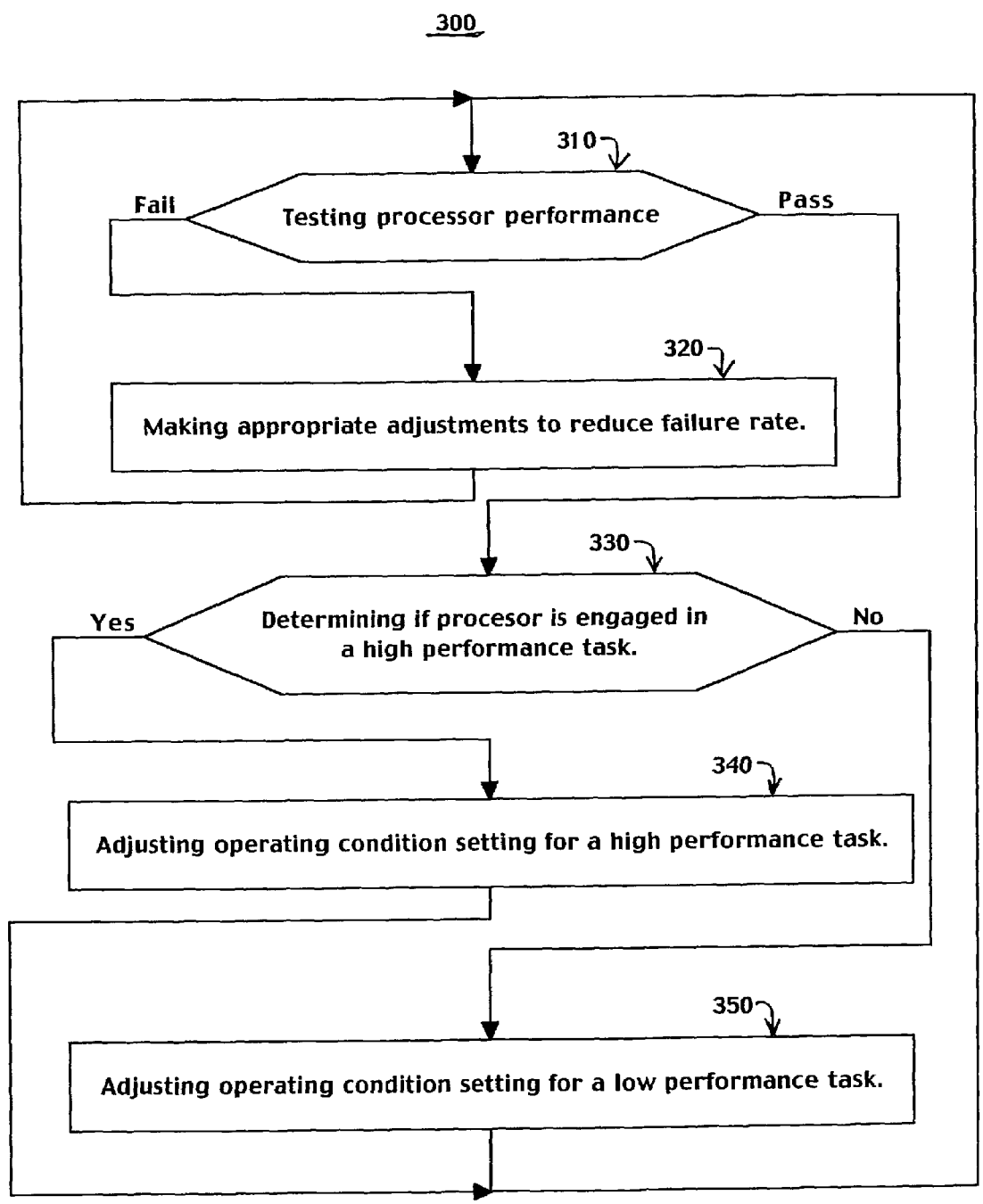
FIG. 3 is a flow chart of a processor performance enhancement and reliability balancing method, a method in accordance with one embodiment of the present invention.

FIG. 3 is a flow chart of processor performance enhancement and reliability balancing method 300, a method in accordance with one embodiment of the present invention. Processor performance enhancement and reliability balancing method 300 facilitates operation of a processor at maximum performance for processing intensive tasks and conservation of processor resources during other tasks. In one exemplary implementation, processor performance enhancement and reliability balancing method 300 allows a processor to exceed nominal operating conditions (e.g., nominal frequency and voltage) for complex tasks and operate below nominal operating conditions for other tasks.

In step 310, processor performance is tested. In one embodiment, the task the processor is engaged in is identified and the accuracy of the results are examined. For example, actual results of the processing are tested against expected results. In one exemplary implementation of the present invention, the error rate of processing results is identified and if the error rate exceeds a predetermined value the performance is considered failing. If the processor performance test is passed the process jumps to step 330. If the processor performance test is failed the process proceeds to step 320.

In one embodiment of the present invention, it is possible to change the test suite instructions in response to results of a self test operation. For example, if a hardware test (e.g., a built in self test) indicated a problem (e.g., a significant error, an excessive amount of errors, a recurring error, etc.) the test suite instructions can be altered to run upon the detection of such an event, or run more frequently, and/or perform a particular type of test suite.

An adjustment is made to reduce a failure rate in step 320. In one embodiment the processor returns to a prior operating condition setting if the processor fails the testing. For example, a clock frequency setting and voltage level setting return (e.g., are decreased) to a value at which the processor operates properly.

At step 330, a determination is made if the processor is engaged in a high performance task. For example, a determination is made if the processor is performing advanced, three dimensional graphics for a video game. If the processor is not engaged in a high performance task the process jumps to step 350. If the processor is engaged in a high performance task the process proceeds to step 340.

In step 340, operating condition settings are adjusted for a high performance task. For example, the voltage level of a power signal to the processor is increased if the processor passes the testing. The clock frequency of the processor can also be adjusted if the processor passes the testing. In one exemplary implementation, operations of a cooling fan are adjusted to provide additional cooling. In one embodiment of the present invention, reliability limitations are factored into the adjustments for high performance tasks.

In one embodiment, a reliability limitation determination process is utilized to factor in reliability limitations on operating condition setting adjustments for a high performance task. In one exemplary implementation, a processor has predefined reliability constraints that define limitations on the percentage of time that a processor operates at a high performance setting compared to a low performance setting. If the processor begins to exceed the percentage of time permitted for high performance settings the adjustment to the high performance settings is prevented until the relative percentage of time at high performance and low performance conforms to the predetermined values.

In step 350, operating condition settings are adjusted for a low performance task. For example, the voltage level of a power signal and frequency of a clock signal to the processor are decreased. In one exemplary implementation, operations of a cooling fan are adjusted to produce less noise (e.g., run in quiet mode).

Figure 8:
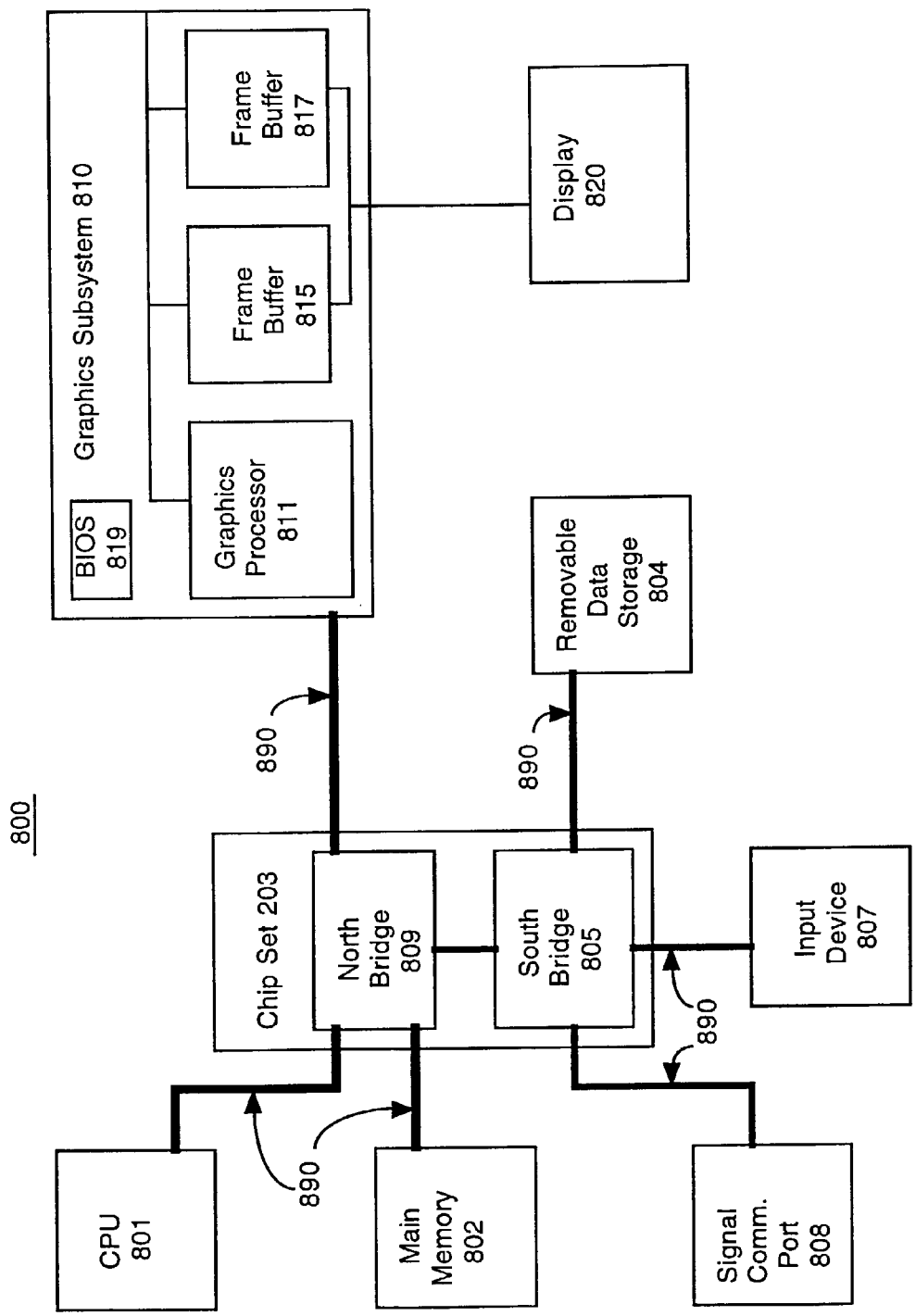
FIG. 8 is a block diagram of one embodiment of a computer system upon which the present invention is implemented.

FIG. 8 is a block diagram of computer system 800, one embodiment of a computer system upon which the present invention is implemented. Computer system 800 includes communication bus 890, central processor unit 801, main memory 802 (e.g., random access memory), chip set 803 with north bridge 809 and south bridge 805, removable data storage device 804, input device 807, signal communications port 808, and graphics subsystem 810 which is coupled to display 820. Communication bus 890 couples chipset 803 to central processor unit 801, main memory 802, removable data storage device 804, input device 807, signal communications port 808 and graphics subsystem 810. Graphics subsystem 810 includes graphics processor 811, BIOS 819 and graphics buffers 815 and 817. In one embodiment of the present invention, graphics processor 811 is included in north bridge 809. In one embodiment, present invention processor performance adjustment systems and methods (e.g., similar to graphics processor management method 100, graphics processor adjustment system 200, processor performance enhancement and reliability balancing method 300, etc.) are utilized to control operations associated with central processing unit 801 and graphics processing unit 811.

The components of computer system 800 cooperatively function to provide a variety of functions, including processing of graphics information in an efficient power conservation manner. Communications bus 890 communicates information, central processor 801 processes information and engages processor operating condition adjustments, main memory 802 stores information and instructions for the central processor 801. Removable data storage device 804 also stores information and instructions (e.g., functioning as a large information reservoir). Input device 806 provides a mechanism for inputting information and/or for pointing to or highlighting information on display 820. Signal communication port 808 provides a communication interface to exterior devices (e.g., an interface with a network). Display device 809 displays information in accordance with data stored in graphics buffers 815 and 817. Graphics processor 811 processes graphics commands from central processor 801 and provides the resulting data to graphics buffers 815 and 817 for storage and retrieval by display monitor 820. Graphics processor 811 also engages in present invention processor operating condition adjustments. In one embodiment of the present invention, graphics subsystem 810 is hot pluggable and the system generates interrupts that can automatically slow down or speed up the system if a power connector (e.g., a power from a hard disk connector) is coupled or uncoupled to graphics subsystem 810.

In one embodiment of the present invention, central processor 801 and graphics processor 811 process instructions associated with the present invention (e.g., instructions associated with graphics processor management method 100, graphics processor adjustment system 200, processor performance enhancement and reliability balancing method 300, etc.). Instructions and data (e.g., computer readable code, etc.) associated with the present invention can be stored on a computer readable medium (e.g., a memory of computer system 800). In one exemplary implementation, graphics subsystem 810 also includes memory.

FIG. 4 is a flow chart of processor performance limitation testing method 400, a processor performance limitation testing method in accordance with one embodiment of the present invention. Processor performance limitation testing method 400 tests processor operating condition or characteristic value limits at which the processor begins to provide unacceptable error rates in processing results. In one exemplary implementation of the present invention, processor performance limitation testing method 400 provides an indication of maximum and minimum clock frequency, voltage level and temperature value combinations at which the processor begins to fail (e.g., produces unacceptable error rates). Processor performance limitation testing method 400 can be utilized in determining adjustments made in graphics processor management method 100 or the determination of operating condition adjustments by processor management component 219.

In step 410 the voltage level of a power supply signal supplied to a processor is adjusted. For example, the voltage level is increased or decreased by a predetermined amount. In one embodiment of the present invention, an indication of the desired adjustment is provided by a performance testing component (e.g., performance testing component 218).

At step 420, the frequency of a clock signal that clocks the processor is altered. For example, the frequency is increased or decreased by a predetermined amount. In one embodiment of the present invention, an indication of the desired adjustment is provided by a performance testing component (e.g., performance testing component 218).

In step 430, the temperature of the processor is manipulated. In one exemplary implementation of the present invention, the temperature of the processor is manipulated by controlling fan operations. For example, the temperature of the processor is lowered by directing the fan operations to provide more cooling.

In step 440, a determination is made to identify combinations of voltage level values of the power signal, processor temperature readings and frequency values of the clock signal at which the performance of the processor begins to fail. In one exemplary implementation, a hardware self test is run and results are factored into the determination of combinations of voltage level values of the power signal and frequency values of the clock signal.

FIG. 5 is a flow chart of processor temperature compensation method 500, one embodiment of the present invention. In one embodiment of the present invention, temperature compensation method 500 regulates the temperature of a processor. In one exemplary implementation, the temperature of the processor is regulated according to a variety of objectives. For example, the temperature may be maintained at below a predetermined amount for low performance tasks and permitted to reach a higher level for high performance tasks or when operating in a quiet mode. Temperature compensation method 500 facilitates achievement of maximum performance while minimizing the probabilities of chip destruction and/or glitches (e.g., hanging up on processing tasks). Processor temperature compensation method 500 can be utilized in determining adjustments made in graphics processor management method 100 or the determination of operating condition adjustments by processor management component 219.

In step 510, the temperature of a processor is sensed. In one embodiment, an on-die thermal diode placed near the pads and/or an external thermal sensor or monitor are utilized to sense the temperature. In one exemplary implementation, the thermal monitor is programmed by the processor through a communication bus (e.g., an $I^2C$ bus). The present invention is readily adaptable to a variety of temperature sensing rates or frequencies (e.g., once every 15.5 ms). The temperature sensor can be programmed for a variety of external temperature limits with corresponding hysteresis settings. The temperature sensor can be programmed to filter alarm readings. For example, an alarm signal is activated after a programmed amount of consecutive over temperature readings occur. This facilitates the minimization of software interruptions overburdening the processor. In one embodiment of the present invention, the temperature sensor or monitor can be included in the same semiconductor chip as the processor (e.g., a CPU, GPU, etc.).

In step 520, a change is made to an operating condition of the processor. In one exemplary implementation, the clock speed of said processor is adjusted if the temperature is outside a predetermined range. For example, the clock speed is decreased if an over-temperature condition occurs (e.g., the temperature is above a predetermined value). In one embodiment of the present invention, the clock speed is reduced by a predetermined factor (½, ¼, ⅛, etc). It is appreciated that a thermal slowdown can be programmed to be enabled never, only when an over temperature condition occurs or all the time regardless of the actual thermal input. In one embodiment, the thermal control is coordinated with performance control. In one exemplary implementation, the thermal control of the clock can be ignored and the clock slowed continuously during the low performance tasks if the performance control indicates the clock should be slowed for low performance tasks.

In one embodiment, a clock frequency slowdown is controlled to be in affect for a programmable portion of time using pulse a width modulation scheme. In one exemplary implementation, the time period of the pulse width modulation is 64 microseconds. A clock signal can operate for full speed for 32 microseconds and then some fractional speed (e.g., ½, ¼, etc.) for the remaining 32 microseconds. This produces a reduced effective clock frequency (e.g., 75% of normal if the slowdown factor is 2×).

In one embodiment of the present invention, a software interrupt can be issued in response to the temperature sensing in step 510. In one exemplary implementation, the software interrupt is generated when the thermal state changes. For example, the interrupt can be generated with respect to the alert signal (e.g., on the rising edge, falling edge, both edges, etc.). Alternatively the processor can be programmed not to generate a software interruption response to a thermal alert. Programming the amount of consecutive over temperature readings that occur before an alert facilitates the minimization of software interrupt generation rate from being an excessive burden on the processor.

In step 530, fan operation is adjusted if the temperature is within predetermined ranges. For example, the fan operation can be controlled to provide increased cooling if the temperature is above a predetermined value. Alternatively, the fan operation can be controlled to operate more quietly if the temperature is below a designated value.

In one embodiment of the present invention, a processor is operated in various noise regulated modes. In one exemplary implementation, a processor noise regulation method is utilized to control fan operations associated with cooling the processor. A determination is made whether to run the processor in quiet mode or performance enhancement mode. The decision regarding which mode to operate in can be triggered by a variety of factors. For example, a user can provide an indication of a selected mode (e.g., via a user interface) or the decision can be based upon the task the processor is performing (e.g., select quiet mode for low performance tasks). An adjustment is made to fan operations based upon the selection of a quiet mode or a performance enhancement mode. For example, fan operations are adjusted to run more quietly if the quiet mode is selected and provide greater cooling capacity if the performance mode is selected. The processor noise regulation method can be utilized in determining adjustments made in graphics processor management method 100 or the determination of operating condition adjustments by processor management component 219.

Figure 11A:
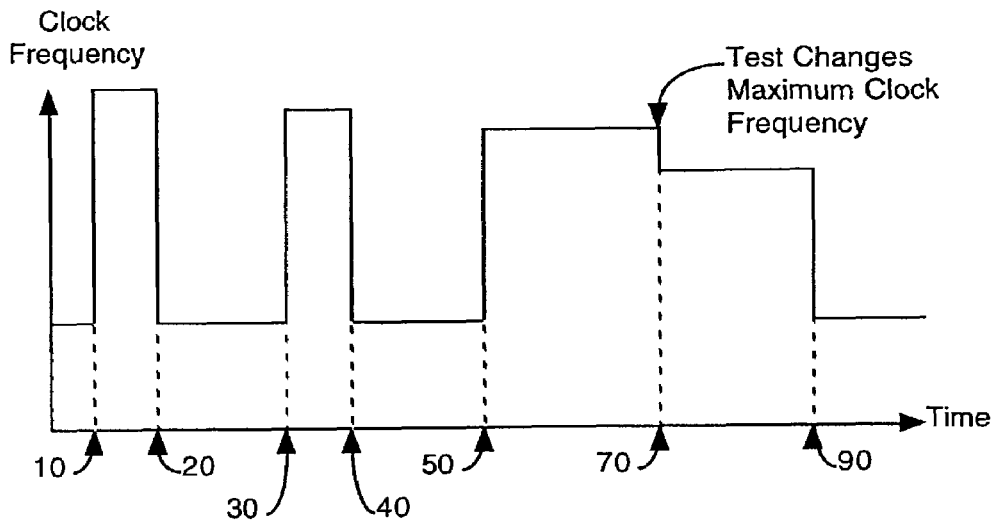
FIG. 11A is a graphical illustrations of exemplary adjustments in a clock signal frequency of a processor operating in performance mode constrained by exemplary corresponding temperature changes in accordance with one embodiment of the present invention.
Figure 11B:
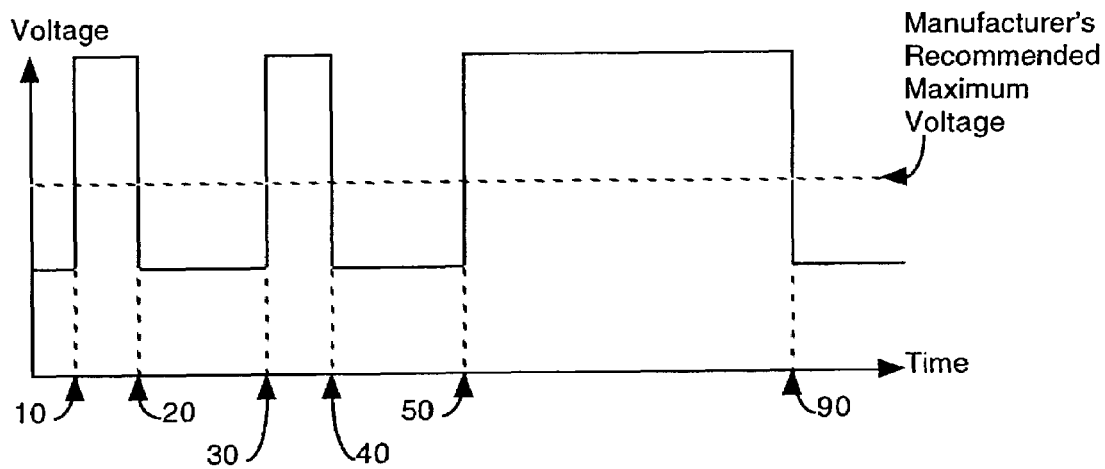
FIG. 11B is a graphical illustrations of exemplary adjustments in a power signal voltage level of a processor operating in performance mode constrained by exemplary corresponding temperature changes in accordance with one embodiment of the present invention.
Figure 11C:
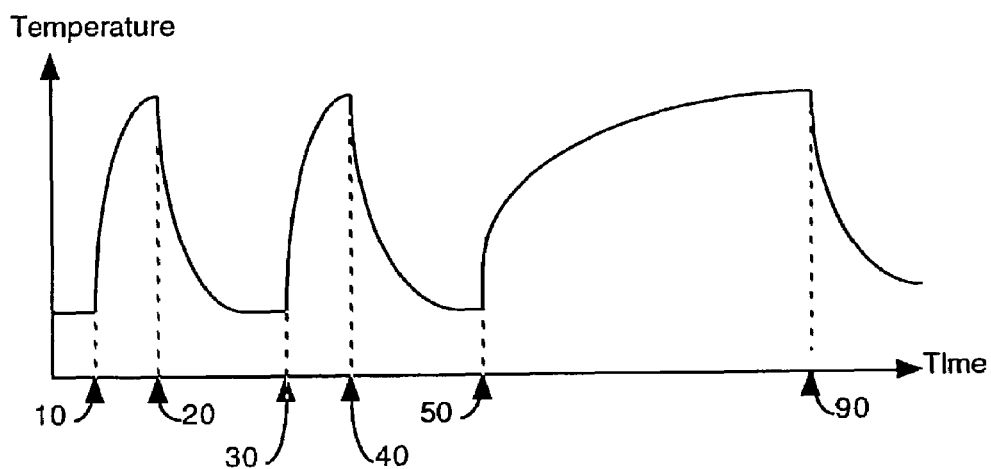
FIG. 11C is a graphical illustration of exemplary temperature changes in a processor in response to adjustments in clock frequency and voltage level in accordance with one embodiment of the present invention.

In one embodiment of the present invention, adjustments are made to a variety of operating conditions based upon mode selection. For example, in performance mode clock signal frequency and power signal voltage level can be adjusted based upon the task being performed and the temperature of the processor. FIGS. 11A and 11B are graphical illustrations of exemplary adjustments in a clock signal frequency and a power signal voltage level of a processor operating in performance mode constrained by exemplary corresponding temperature changes illustrated in FIG. 11C. For example, at times 10, 30 and 50, the processor enters enhanced performance mode, and the clock signal frequency and power signal voltage level are increased. At times 20, 40, and 90, the processor enters a low performance mode, and the clock signal frequency and power signal voltage level are decreased. The example of FIG. 11C also shows the clock frequency adjusted at time 70 in response to test results (e.g., tests indicating errors are beginning to occur) or error detection within the logic.

The present invention facilitates enhanced processor performance with minimal impact to reliability by maintaining conservation of average processor lifetime. This is a significant advantage over previous operating condition adjustment implementations which do not run a processor at its full performance potential. The present invention assists a processor to provide increased user satisfaction for advanced processing applications and enables reduction of unpleasant noise during reduced processing application. A present processor performance adjustment system and method also provides safeguards to facilitate preservation of processor reliability for an anticipated life span of the processor.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents. The listing of steps within method claims do not imply any particular order to performing the steps, unless explicitly stated in the claim.

What is claimed is:

1. A processor adjustment system comprising:
   a processing unit for performing tasks;
   a voltage source unit for generating a power signal for said processing unit;
   a performance testing component for testing the performance of said processing unit to determine a high voltage level and a low voltage level at which said processing unit begins to fail;
   a voltage control component for controlling the voltage level of said power signal within an envelope determined by said performance testing component, wherein said power signal voltage is increased for high performance tasks and reduced for low performance tasks of said processing unit, wherein said high performance tasks comprise rendering three-dimensional graphics images; and
   a memory for storing test suite instructions for execution by said performance testing component.

2. The processor adjustment system of claim 1 further comprising:
   a clock signal generating unit for generating a clock signal for said processing unit; and
   a clock control component for controlling the frequency of said clock signal within an envelope determined by said performance testing component, wherein said clock signal frequency is increased for high performance tasks and reduced for low performance tasks of said processing unit.

3. The processor adjustment system of claim 1 wherein said processing unit is a graphics processor.

4. The processor adjustment system of claim 1 wherein said testing is performed at each power up of said system.

5. The processor adjustment system of claim 1 wherein the performance nature of said task is user defined.

6. The processor adjustment system of claim 1 wherein the performance nature of said task is defined by an application program executing said task.

7. The processor adjustment system of claim 1 wherein said testing is performed periodically.

8. A processor adjustment system comprising:
   a processing unit for performing processing tasks;
   a clock signal generating unit for generating a clock signal for said processing unit;
   a performance testing component for periodically testing the performance of said processing unit to determine an envelope including a high clock frequency and a low clock frequency at which said processing unit begins to fail;
   a clock control component for controlling the frequency of said clock signal within said envelope determined by said performance testing component, wherein said clock signal frequency is increased for high performance tasks and reduced for low performance tasks of said processing unit, wherein said high performance tasks comprise rendering three-dimensional graphics images; and
   a memory for storing test suite instructions for execution by said performance testing component.

9. The processor adjustment system of claim 8 wherein said performance testing component also determines a minimum clock frequency at which said processing unit begins to fail.

10. The processor adjustment system of claim 8 wherein said performance testing component is controlled by software running on a CPU, said CPU being different from said processing unit.

11. The processor adjustment system of claim 8 further comprising a voltage control component for controlling the voltage level of a power signal for said processing unit, wherein said power signal voltage is set to a higher voltage for said high performance tasks than for said low performance tasks.

12. The processor adjustment system of claim 8 wherein said processor is a graphics processor.

13. The processor adjustment system of claim 12 wherein said high performance tasks comprise rendering interactive three-dimensional graphics images.

14. The processor adjustment system of claim 13 wherein said low performance tasks do not comprise rendering interactive three-dimensional graphics images.

15. A processor adjustment system of claim 8 wherein said test suite instructions and models are included in a basic input output system (BIOS).

16. A processor adjustment system of claim 15 wherein said test suite instructions are based upon binning of said processor unit and said memory on an individual and combined board basis.

17. A processor adjustment system of claim 16 wherein said test suite instructions are changed in response to results of a self test operation.

18. A processor performance enhancement and reliability balancing method comprising:
storing test suite instructions in a memory for execution by a performance testing component;
testing processor performance, wherein said testing comprises determining a high clock frequency and a low clock frequency at which said processor begins to fail;
making an adjustment to reduce a failure rate;
determining if said processor is engaged in a high performance task, wherein said high performance tasks comprise rendering three-dimensional graphics images;
adjusting operating condition settings for a high performance task, including increasing the speed of a fan during said high performance task;
determining if said processor is engaged in a low performance task; and
adjusting operating condition setting for a low performance task, including decreasing the speed of a fan during said low performance task.

19. The processor performance enhancement and reliability balancing method of claim 18 wherein said testing provides an indication of errors.

20. The processor performance enhancement and reliability balancing method of claim 19 wherein said indication of an error occurring does not trigger an operating condition adjustment unless a predetermined unacceptable level of errors occur.

21. The processor performance enhancement and reliability balancing method of claim 20 wherein crossing a threshold triggers tests that determine said adjustment to said operating condition.

22. The processor performance enhancement and reliability balancing method of claim 19 wherein said indication of a single error triggers an operating condition adjustment.

23. The processor performance enhancement and reliability balancing method of claim 22 wherein crossing a threshold triggers tests that determine said adjustment to said operating condition.

24. The processor performance enhancement and reliability balancing method of claim 19 wherein the type of error is considered in addition to the number of errors before making an operating condition adjustment.

25. The processor performance enhancement and reliability balancing method of claim 18 wherein said testing further comprises determining a high voltage and a low voltage at which said processor begins to fail.

26. The processor performance enhancement and reliability balancing method of claim 18 further comprising adjusting the clock frequency of said processor if said processor passes said testing.

27. The processor performance enhancement and reliability balancing method of claim 18 further comprising increasing the speed of a fan during a high performance task.

28. The processor performance enhancement and reliability balancing method of claim 18 wherein said processor is a graphics processor.

29. A processor performance limitation testing method comprising:
adjusting the voltage level of a power supply signal supplied to a processor;
altering the frequency of a clock signal that clocks said processor;
determining combinations of voltage level values of said power signal and frequency values of said clock signal at which said processor begins to fail, said determining further comprising determining a high voltage and clock frequency and a low voltage and clock frequency at which said processor begins to fail;
wherein said determining includes running a hardware self test and factoring results of said hardware self test into said determining combinations of voltage level values of said power signal and frequency values for different performance task, wherein a high performance task comprises rendering three-dimensional graphics images.

30. The processor performance limitation testing method of claim 29 further comprising altering the temperature of said processor.

31. The processor performance limitation testing method of claim 29 wherein said frequency is increased for high performance tasks and reduced for low performance tasks of said processing unit, wherein said high performance tasks comprise rendering interactive three-dimensional graphics images.

32. The processor performance limitation testing method of claim 29 wherein said processor is a graphics processor.

33. A computer system comprising:
a CPU;
a memory coupled to said CPU for storing test suite instructions for execution by a performance testing component;
a graphics processing unit for performing processing tasks;
a control unit coupled to said CPU for controlling a clock signal and a power signal for said graphics processing unit, wherein the frequency of said clock signal and voltage level of said power signal is adjusted based upon user demanded performance, said user demanded performance including a high performance task comprising rendering three-dimensional graphics images; and
wherein said control unit maintains said frequency of said clock signal and said voltage level of said power signal within an envelope determined by said control unit, wherein limitations of said envelope are defined by a high voltage and clock frequency and a low voltage and clock frequency at which said processor begins to produce errors at an unacceptable rate.

34. A computer system of claim 33 wherein limitations of said envelope are defined by a point at which said processor begins to produce errors at an unacceptable rate.

35. A computer system of claim 34 wherein said control unit also controls fan operations directed to maintaining the temperature of said processor within an acceptable range.

36. A processor management method comprising:
- storing test suite instructions in a memory for execution by a performance testing component;
- selecting a desired processor management objective, wherein said management objective is associated with a particular application type of task;
- analyzing an operating condition of a processor, wherein said analyzing comprises executing said test suite instructions to determine a high clock frequency and voltage and a low clock frequency and voltage at which the processor begins to fail;
- comparing said operating condition of said processor to an operating condition setting associated with said desired management objective; and
adjusting said operating condition of said processor according to said desired processor management objective, wherein said task comprises a high performance task comprising rendering three dimensional graphics images.

37. A processor management method of claim 36 wherein said management objective includes obtaining maximum performance with accurate results for a said particular application type of task.

38. A processor management method of claim 36 wherein said management objective includes conserving lifetime operating reliability of the processor while providing accurate results for an application type of task.

39. A processor management method of claim 36 wherein said management objective includes maintenance of a relatively low processor temperature.

40. A processor management method of claim 36 wherein said analyzing includes an examination of processor performance.

41. A processor management method of claim 36 wherein said analyzing includes determining the complexity of the task the processor is performing, the speed at which it is performing the task and the accuracy of the results.

42. A processor management method of claim 36 wherein a desired speed is indicated to be the maximum speed at which the processor can operate without introduction of an excessive error rate.

43. A processor management method of claim 36 wherein the frequency of a clock signal and voltage level of a power signal are adjusted.

44. A processor management method of claim 36 wherein the magnitude and direction of the frequency and voltage adjustment corresponds to said desired objective.

45. A processor management method of claim 36 wherein said desired objective is to obtain maximum performance with accurate results for particular application task and a clock signal frequency and a power signal voltage level are increased to a point just before errors begin to occur.

46. A processor management method of claim 36 wherein said desired objective is to conserve lifetime operating reliability of the processor during a low performance application task and a clock signal frequency and a power signal voltage level are reduced to a point just before errors begin to occur.

47. A processor management method of claim 36 wherein a temperature operating condition of the processor is altered.

48. A processor management method of claim 36 wherein a temperature operating condition of a processor is altered by changing a clock signal frequency, generating an interrupt that causes software to take additional actions, or directing a fan to provide more or less cooling.

49. A processor management method of claim 36 further comprising setting operating conditions to achieve multiple objectives with varying priorities.

50. A processor management method of claim 49 wherein said adjusting said operating condition of said processor is not performed unless a predetermined unacceptable level of errors occur.

51. A processor management method of claim 50 wherein crossing a threshold triggers tests that determine adjustments to said operating condition.

52. A processor management method of claim 49 wherein said adjusting said operating condition of said processor is performed in response to a single error detection.

53. A processor management method of claim 52 wherein crossing a threshold triggers tests that determine adjustments to said operating condition.

54. A processor management method of claim 49 wherein said analyzing comprises analysis of error indications.

55. A processor management method of claim 54 wherein the type of error is considered in addition to the number of errors before making an operating condition adjustment.

56. A processor management method of claim 36 wherein said processor is a graphics processor.

57. A processor adjustment system comprising:
- a processor for processing information;
- a means for storing test suite instructions for execution by a performance testing component;
- a means for testing the performance of said processor, wherein said means for testing the performance of said processor determines a high clock signal frequency and power signal voltage level and a low clock signal frequency and power signal voltage level at which said processor begins to produce errors;
- wherein said means for testing the performance of said processor determines whether the processor is performing a high performance task or a low performance task, said high performance task comprising rendering three dimensional graphics images; and
- a means for adjusting multiple operating conditions of said processor based upon performance test results of said processor.

58. A processor adjustment system of claim 57 wherein said means for testing the performance of said processor comprises a set of error checking circuits distributed at various points within a graphics processing pipeline logic.

59. A processor adjustment system of claim 57 wherein said processor is a graphics processing unit and said means for testing the performance of said processor comprises software running on a central processing unit.

60. A processor adjustment system of claim 57 wherein said processor is a graphics processing unit and said means for testing the performance of said processor comprises software running within said graphics processing unit.

61. A processor adjustment system of claim 57 wherein said processor is a graphics processing unit and said means for testing the performance of said processor comprises external circuits that check outputs from said graphics processor unit.

62. The processor adjustment system of claim 57 wherein said operating conditions include a clock signal frequency and a power signal voltage level.

63. The processor adjustment system of claim 57 wherein said operating conditions include a temperature of said processor.

64. The processor adjustment system of claim 57 wherein said means for testing the performance of said processor determines clock signal frequencies and power signal voltage levels at which said processor begins to produce errors.

65. The processor adjustment system of claim 57 wherein said means for testing the performance of said processor determines whether a processor is performing a high performance or low performance task.

66. A computer system comprising:
- a memory for storing test suite instructions for execution by a performance testing component;
- a graphics processing unit for processing information and clocked by a clock signal frequency;
- a temperature sensor for sensing temperature of said graphics processing unit;
- a processor management component for controlling adjustments to operating conditions of said graphics processing unit, wherein said adjustments correspond to a combination of enhanced performance, particular application type of task, and reliability maintenance objectives for said graphics processing unit, wherein said task comprises a high performance task comprising rendering three dimensional graphics images; and
- wherein said performance testing component determines a high clock frequency and voltage and a low clock frequency and voltage at which the processor begins to fail.

67. The computer system of claim 66 wherein said processor management component determine control adjustments of a clock signal frequency, a power signal voltage level supplied to said graphics processing unit and the operation of a fan for cooling said graphics processing unit.

68. The computer system of claim 66 wherein said adjustments correspond to a quiet mode operation.

* * * * *